(12) United States Patent
Baber et al.

(10) Patent No.: US 6,195,696 B1
(45) Date of Patent: Feb. 27, 2001

(54) SYSTEMS, METHODS AND COMPUTER PROGRAM PRODUCTS FOR ASSIGNING, GENERATING AND DELIVERING CONTENT TO INTRANET USERS

(75) Inventors: Stephen C. Baber, Raleigh; Brian Blount, Chapel Hill; Kathryn Heninger Britton, Chapel Hill; David Louis Kaminsky, Chapel Hill, all of NC (US); Ann Marie O'Meara, Cleveland, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,697

(22) Filed: Oct. 1, 1998

(51) Int. Cl.⁷ .................................................. G06F 15/173
(52) U.S. Cl. ........................... 709/223; 709/223; 709/217
(58) Field of Search .................................... 709/249, 206, 709/225, 217, 220, 223

(56) References Cited

U.S. PATENT DOCUMENTS

| | | | |
|---|---|---|---|
| 5,530,852 | * 6/1996 | Meake, Jr. et al. | 709/206 |
| 5,754,938 | 5/1998 | Herz et al. | 455/4.2 |
| 5,784,608 | 7/1998 | Meske, Jr. et al. | 395/602 |
| 5,835,087 | * 11/1998 | Herz et al. | 345/327 |
| 5,848,396 | * 12/1998 | Gerace | 705/10 |
| 5,867,667 | * 2/1999 | Butman et al. | 709/249 |
| 5,895,470 | * 4/1999 | Pirolli et al. | 707/102 |
| 6,003,040 | * 12/1999 | Mital et al. | 707/103 |

OTHER PUBLICATIONS

Cardinal, "The Right Documents, at the Right Time, in the Right Context", FirstFloor Software, Inc., 1997.*

Channel Definition Format (CDF), http://www.microsoft.com/standards/cdf/default.asp, pp. 1–13, (©1998 Microsoft Corporation).

Cardinal, *The Right Documents, at the Right Time, in the Right Context*, http://www.firstfloor.com (©1997 FirstFloor Software, Inc.).

Loon et al., "Alleviating the Latency and Bandwidth Problems in WWW Browsing," Proceedings of the USENIX Symposium on Internet Technologies and Systems, Monterey, CA, pp. 219–230 (Dec. 8–11, 1997).

Rucker, Jr., et al., "Siteseer: Personalized Navigation for the Web. Bookmarks can be a Key Component for Gathering Preferential Information,: Communications of the Association for Computing Machinery," vol. 40, No. 3, pp. 73–75 (Mar. 1, 1997).

* cited by examiner

*Primary Examiner*—Zarni Maung
*Assistant Examiner*—Philip B. Tran
(74) *Attorney, Agent, or Firm*—Myers Bigel Sibley & Sajovec; Jeanine S. Ray-Yarletts

(57) ABSTRACT

Systems, methods and computer program products allow intranet administrators to assign, generate and deliver content to users of an intranet. Intranet users are defined and assigned to various defined user groups. Units of content available to users of an intranet are also defined and assigned to various defined content groups. The defined content groups are then associated with the defined user groups such that each of the defined user groups has at least one of the defined units of content associated therewith. A content page creation profile is provided for each defined user and is configured to control how content is displayed within a user's customized content page. Through identified relationships of user groups and content groups, the units of content assigned to a user can be determined and a content page containing the assigned units of content can be created and delivered to a user.

18 Claims, 31 Drawing Sheets

FIG. 30

```
<HTML>
 <HEAD>
  <TITLE>Edit <@login>'s Page Content</TITLE>

<@import:showAbout.html>

</HEAD>

<@import:bodytag.html>
 <CENTER>

<@if:adminUser>
<@import:HPmap.html>
<@endif>
<@ifnot:adminUser>
<@import:salesmap.html>
<@endifnot>

<H2>Edit <@login>'s Page Contents</H2>
  <B><I>Current Profile: <@currentprof></I></B>

<FORM ACTION="/servlet/changehome" METHOD=POST>
   <TABLE BORDER=2 CELLPADDING=5>
    <TR>
     <TH>Type</TH>
     <TH>Name</TH>
     <TH>Display Type</TH>
     <TH>More Info</TH>
    </TR>
<@if:appletCount>
    <TR>
     <TH ROWSPAN=<@appletCount>>Applets</TH>
    </TR>
<@endif>
<@loop:reqApps>
    <TR>
     <TD><@reqApps></TD>
     <TD ALIGN=CENTER>
      <SELECT NAME="<@reqApps>" SIZE=1>
       <OPTION <@reqAppsOnPageFlag>>Embedded
       <OPTION <@reqAppsAsLinkFlag>>Linked
       <OPTION <@reqAppsAsButtonFlag>>Launched
      </SELECT>
     </TD>
     <TD ALIGN=CENTER>
      <INPUT TYPE=BUTTON VALUE="More Info"
       onClick = "showAbout('<@reqApps>', 'Applet')">
     </TD>
    </TR>
<@endloop>
<@loop:optApps>
     <TR>
```

SYSTEMS, METHODS AND COMPUTER PROGRAM PRODUCTS FOR ASSIGNING, GENERATING AND DELIVERING CONTENT TO INTRANET USERS

FIELD OF THE INVENTION

The present invention relates generally to computer networks and, more particularly, to private computer networks.

BACKGROUND OF THE INVENTION

An intranet is a private computer network contained within an enterprise and conventionally includes one or more intranet servers in communication with multiple user computers. An intranet may be comprised of interlinked local area networks and may also use leased-lines in a wide-area network. An intranet may or may not include connections to the outside Internet. Intranets conventionally utilize various Internet protocols and, in general, often look like private versions of the Internet. An intranet user conventionally accesses an intranet server via a web browser running locally on his/her computer. An exemplary web browser is Netscape Navigator® (Netscape Communications Corporation, Mountain View, Calif.).

Information, applications and other resources (collectively referred to herein as "content") are conventionally delivered from an intranet server to a web browser on a user's computer in the form of hypertext documents or "web pages." As is known to those skilled in this art, a web page is conventionally formatted via a standard page description language such as HyperText Markup Language (HTML), and typically displays text and graphics, and can play sound, animation, and video data. HTML provides basic document formatting and allows a web page developer to specify hypertext links (typically manifested as highlighted text) to other servers and files. When a user selects a particular hypertext link, a web browser reads and interprets the address, called a URL (Uniform Resource Locator) associated with the link, connects the web browser with the web server at that address, and makes an HTTP request for the web page identified in the link. The web server then sends the requested web page to the client in HTML format which the browser interprets and displays to the user.

Intranets are conventionally used to share content among the employees of an enterprise. When intranets first emerged, content tended to be focused towards a particular set of users. However, as intranets have become more integral with the day-to-day operations of an enterprise, intranet content has become available for many different sets of users. Unfortunately, the task of organizing, distributing and updating large amounts of intranet content can be difficult. Furthermore it can be difficult for users to keep track of and locate content relevant to their jobs.

FIGS. 1 and 2 illustrate exemplary content-containing web pages (referred to hereinafter as "content pages") displayed via a web browser in communication with an intranet server. In FIG. 1, the displayed content on the content page 10 includes a list 12 of available "Administrative Documents". In FIG. 2, a user has selected item 12e from the content page list 12 of FIG. 1, and a list of "1998 Function Reports" 14 has been displayed within a second content page 16, as a result.

Users of an intranet are typically interested only in a subset of the total content available through an intranet. As a result, intranet users often create "bookmarks" or shortcuts to particular content. For example, a user of the intranet content pages illustrated in FIGS. 1 and 2 may only have an interest in the unit of content entitled "1998 Guidelines for Client Managers" (FIG. 2). Rather than accessing the content by displaying the content pages 10, 16 of FIGS. 1 and 2, a user can bookmark and store the URL for this unit content ("1998 Guidelines for Client Managers") within his or her web browser. The URL for the unit of content entitled "1998 Guidelines for Client Managers" is: (http://intranet/admin/manage_com/1998_function_reports/1998_guidelines_client_mgrs.pdf).

Bookmarks are created within the web browser of a user's computer and are typically stored locally on the user's computer. Unfortunately, the use of bookmarks can be disadvantageous for several reasons. Locally stored bookmarks may become inoperative if content referenced by a bookmark is relocated to another URL. Furthermore, a user may not have access to his or her locally stored bookmarks if he or she uses a different computer or device to access the intranet.

Often, management of an enterprise wants to direct intranet users to specific content. Unfortunately, it may be difficult for an intranet administrator to force users to update their locally stored bookmarks to reflect changes in the location of content or to reflect new content. As a result, intranet administrators often deploy content pages of available URLs to help users find relevant content. In effect, these content pages act as index pages for the content of an intranet. Unfortunately, for intranets containing large amounts of content, a user may have to search through large numbers of URLs to locate specific content. For example, a Java programmer seeking content related to his/her programming job may have to initially access an index content page, then an engineering content page, then a programming content page, and then a Java content page to locate the particular content. For many enterprises, the amount of available content may make the task of locating specific content difficult.

Intranet usage can increase computer network traffic, especially in enterprises where many users are accessing the same content from intranet servers. Such increased traffic may also cause "bursts" of network traffic, such as when a number of users log into an intranet site in the morning, which may require network resources to be able to handle these bursts which may be significantly more traffic than the steady state traffic level of the network. Increased network traffic may hamper the availability of content. In addition, some requested content may require some type of transformation in order to be viewable by various users' computers. Unfortunately, content transformation may increase processing demands on the server which can degrade server performance, especially during times of peak demand.

SUMMARY OF THE INVENTION

In view of the above discussion, it is an object of the present invention to provide intranet users with the ability to quickly and easily locate and access content.

It is another object of the present invention to allow intranet users to create and maintain customized content page access to content that is available from any computer connected to an intranet.

It is another object of the present invention to allow intranet administrators to direct specific content to intranet users regardless of where a user's point of access to the intranet is located.

It is another object of the present invention to facilitate the efficient use of intranet system resources and to facilitate the reduction of computer network traffic caused by intranet access and content transformation.

These and other objects of the present invention are provided by systems, methods and computer program products for assigning, generating and delivering content to users of an intranet. Intranet users are defined and assigned to various defined user groups. Units of content available to users of an intranet are also defined and assigned to various defined content groups. The term "unit of content" refers to any type of information including, but not limited to, a hypertext link (i.e., web link) to information contained elsewhere; an activation device, such as a button on a web page displayed to a user that launches a new browser window to display information; and information embedded within a web page displayed to a user. The defined content groups are then associated with the defined user groups such that each of the defined user groups has at least one of the defined units of content associated therewith. A content page creation profile is provided for each defined user and is configured to control how content is displayed within a user's customized content page.

According to another aspect of the present invention, a content page is generated for a user when the user logs in to an intranet. Upon identifying the user, user groups to which the user is assigned are then identified. Content groups associated with the identified user groups are then identified. Through the identified relationships of user groups and content groups, the units of content assigned to the user can be determined and a content page containing the assigned units of content is created. Preferably, the units of content displayed on a user's content page are arranged according to a content page creation profile assigned to the user. The created content page is then delivered to the user for display via a web browser on the user's device.

The present invention is advantageous because, upon logging in to an intranet, a user is provided with a customized content page that provides access to content specifically relevant to the user. Accordingly, a user does not have to search through pages of often irrelevant content listings to locate content relevant to his or her job. A user can receive his or her content on any device in communication with an intranet implementing the present invention. An intranet administrator can also direct specific content to intranet users regardless of where a user's point of access to the intranet is located. In addition, users can create and maintain customized content pages from any device connected to the intranet.

According to another aspect of the present invention, content may be delivered to a user's computer during off-peak hours prior to the generation of user requests for the content. Units of content assigned to a content group may be prefetched from an intranet, or from the Internet, and exported into a content package. Content packages may be optionally compressed. A determination may be made whether a user device already contains the present version of the content package and, if not, the content package can be transmitted to the user device. Preferably, content delivery according to this aspect of the present invention is performed during off-peak hours when network traffic is low. Because a given content group may be shared by a large number of users, the retrieval and delivery of this content group prior to receiving user requests can substantially reduce network traffic and furthermore allow for controlled delivery so as to spread network traffic out over time to reduce traffic bursts.

The present invention also allows content transformations to be performed during off-peak hours, thus conserving processor capacity and reducing user wait time. Preferably, prefetched units of content are transformed from a first format to a second format prior to being exported into a compressed content package. For example, a color image may be transcoded into a gray scale image upon determining that a particular user device is configured to only display gray scale images. Content transformation of prefetched content according to the present invention can reduce processor demand during times of peak demand.

BRIEF DESCRIPTION OF THE DRAWINGS

FIGS. 10–30 illustrate various exemplary user interfaces for carrying out aspects of the present invention related to assigning content to users of a computer network.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Client/Server Communications

As is known to those with skill in this art, an intranet may be implemented within a client-server environment. A client is the requesting program in a client/server relationship. A server awaits and fulfills requests from clients in the same or other computers. A given application in a computer may function as a client with requests for services from other programs and a server of requests from other programs. As is understood by those skilled in the art of client/server communications, an authentication server may be utilized to create an environment associated with a specific set of user credentials.

Figure 1:
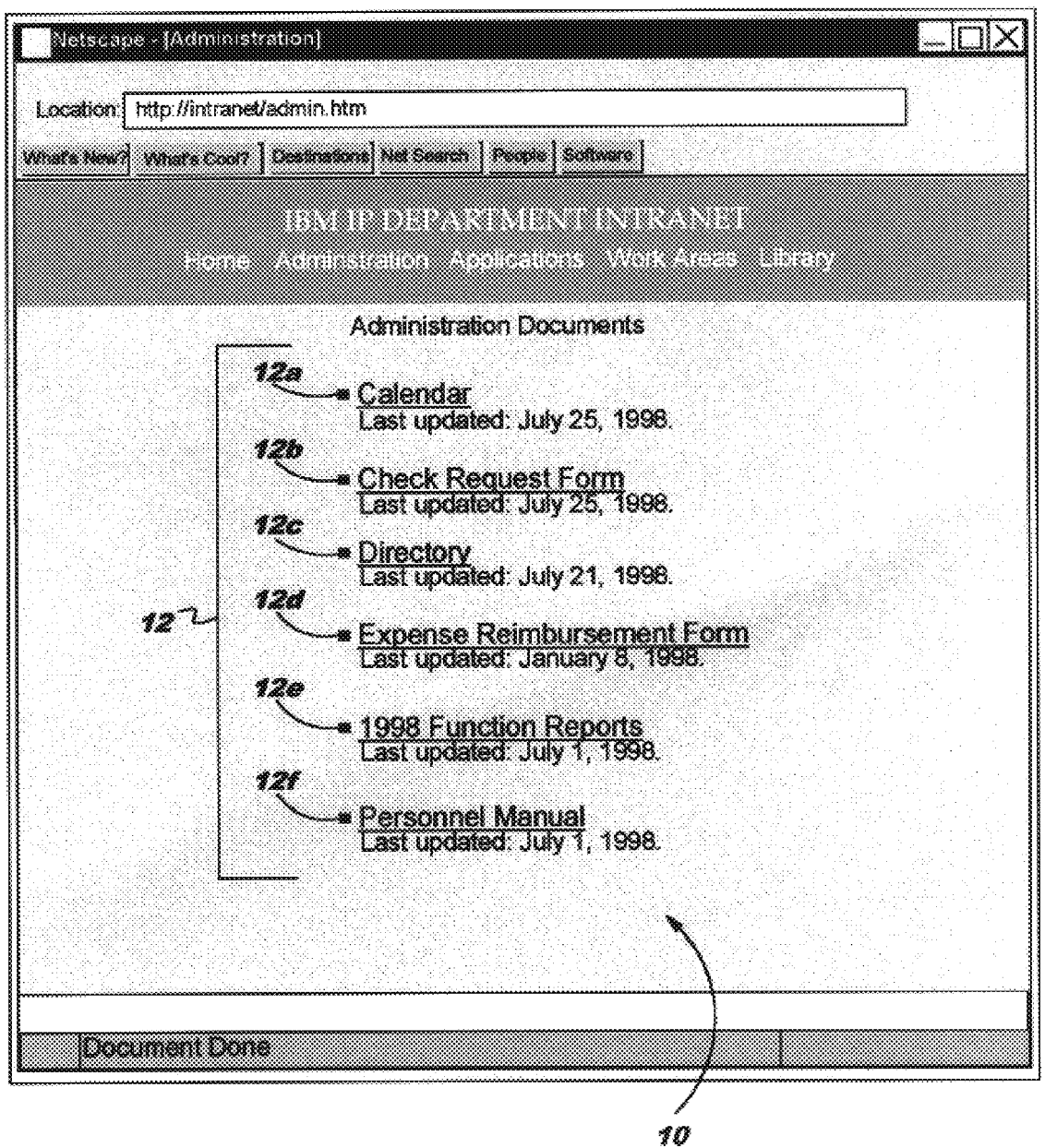
FIGS. 1–2 illustrate exemplary content pages, displayed via a browser, that contain lists of URLs for accessing respective units of content available through an intranet.
Figure 2:
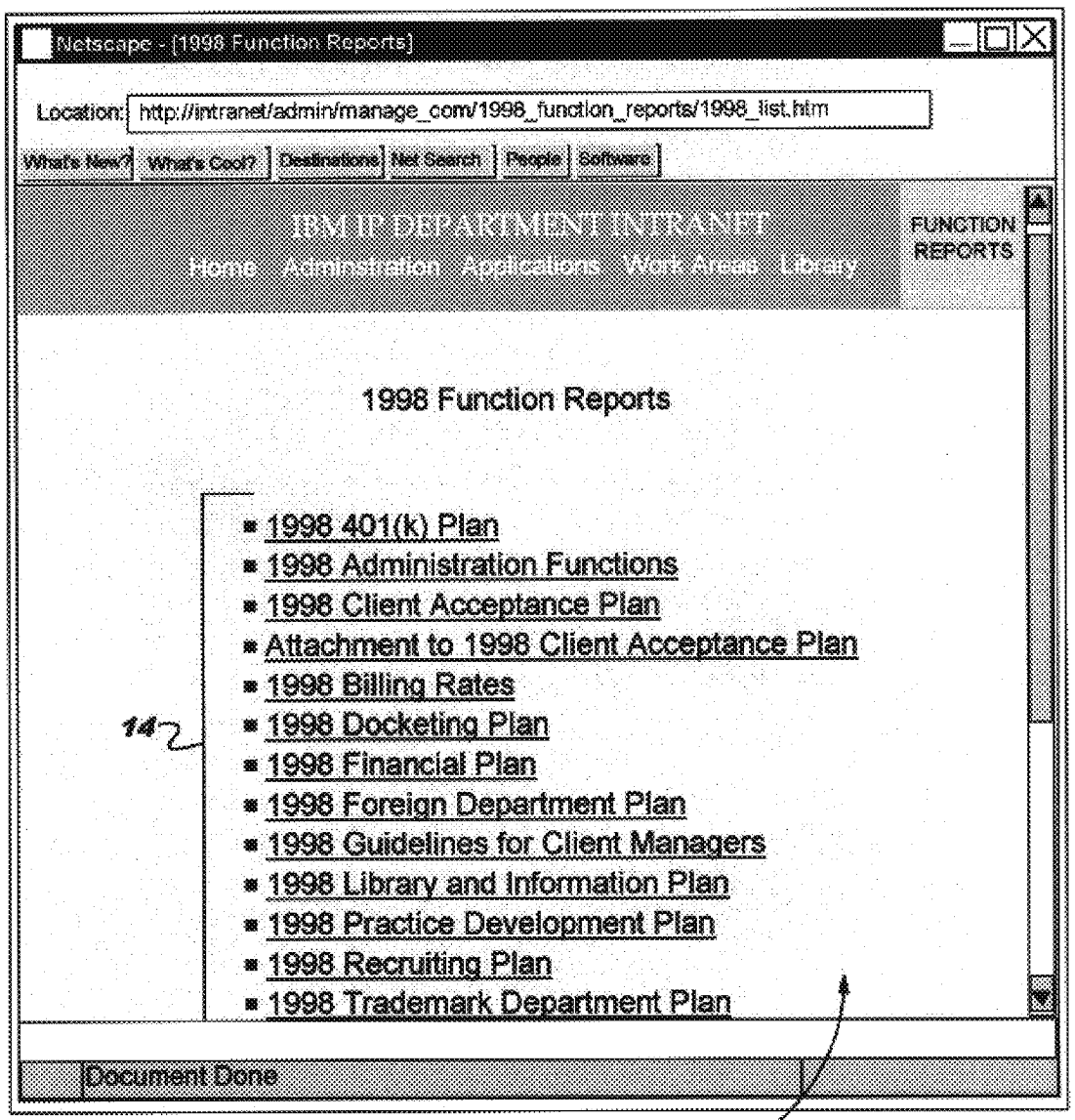
Figure 3:
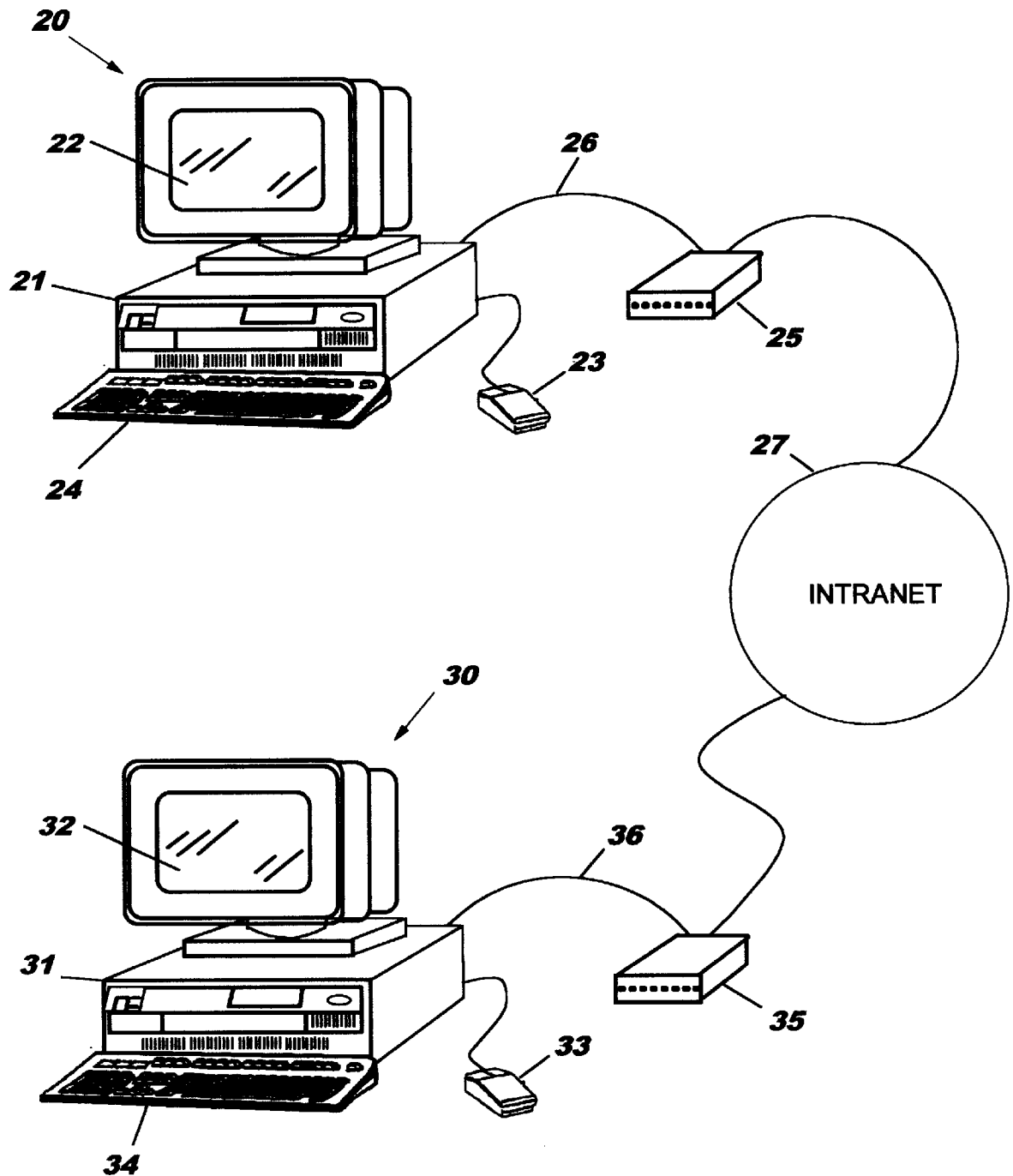
FIG. 3 schematically illustrates a client hosting computer and a server-hosting computer in communication via an intranet in which the present invention can be implemented.

Referring now to FIG. 3, a client/server communications configuration within which the present invention can be implemented is schematically illustrated. Users typically access an intranet using a client program, such as a web browser, running on a computer 20. Web browsers typically provide a graphical user interface for retrieving and viewing web pages hosted by servers. Exemplary client-hosting computers 20 may include, but are not limited to, Apple®, IBM®, or IBM-compatible personal computers. A client-hosting computer 20 preferably includes a central processing unit 21, a display 22, a pointing device 23, a keyboard 24, a communications device 25 (such as a modem or network interface), and a connection 26 for connecting to the intranet 27. The keyboard 24, having a plurality of keys thereon, is in communication with the central processing unit 21. A pointing device 23, such as a mouse, is also connected to the central processing unit 21. The intranet connection 26 may be made via traditional phone lines, an ISDN link, a T2 link, a T3 link, via cable television, via an ethernet network, and the like.

The central processing unit 21 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client-hosting computer 20 and a server-hosting computer (described below) to store various data transferred from a server.

Preferably, a client-hosting computer 20 has an Intel® 80486 processor (or equivalent) with at least eight megabytes (8 MB) of RAM, and at least five megabytes (5 MB) of persistent computer storage for caching. Even more preferable is an Intel® Pentium® processor (or equivalent). However, it is to be understood that various processors may be utilized to carry out the present invention without being limited to those enumerated herein. A client-hosting computer 20, if an IBM®, or IBM-compatible personal computer, preferably utilizes either a Windows® 3.1, Windows 95®, Windows 98®, Windows NT®, Unix®, or OS/2® operating system. However, it is to be understood that a device not having computational capability, or having limited computational capability, may be utilized in accordance with the present invention for retrieving content through an intranet.

Typically, an intranet user accesses content by establishing TCP/IP communications between a client-hosting computer 20 and a server-hosting computer 30 (referred to hereinafter as an intranet server). For many intranet communications, a web browser communicates with an intranet server using HyperText Transfer Protocol (HTTP) over a Transmission Control Protocol/Internet Protocol (TCP/IP) link between the client-hosting computer 20 and the intranet server 30. Typically, the data transferred between the client-hosting computer 20 and the intranet server are HTTP data objects (e.g. HTML data).

As is known by those having skill in the art, an intranet server-hosting computer 30 may have a configuration similar to that of a client-hosting computer 20 and may include a central processing unit 31, a display 32, a pointing device 33, a keyboard 34, a communications device 35, and an intranet connection 36 for connecting to the intranet 27. It is preferable that an intranet server-hosting computer 30 have an Intel® Pentium® processor (or equivalent). However, an intranet server-hosting computer 30 may be implemented using other processors and via other computing devices, including, but not limited to, mainframe computing systems and mini-computers. Intranet server software handles requests from clients for documents, whether they are text, graphic, multimedia, or virtual. The intranet server software typically runs under the operating system of the intranet server.

Figure 4:
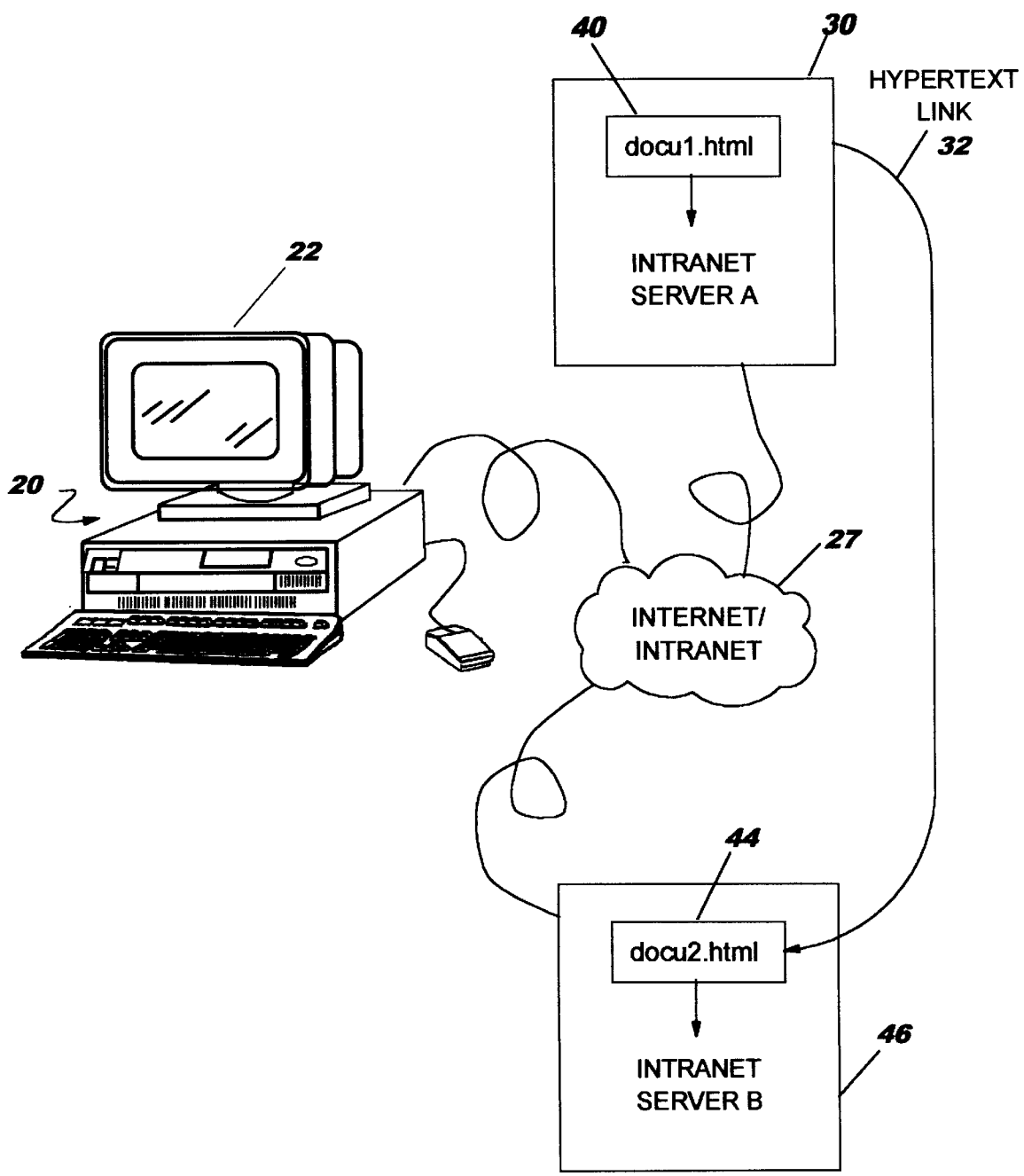
FIG. 4 schematically illustrates an intranet client accessing a content page, hosted by an intranet server.

Referring now to FIG. 4, accessing content hosted by an intranet server is schematically illustrated. During a typical client/server communication, a client-hosting computer 20, via a browser, makes a TCP/IP request for a web page 40 from the intranet server-hosting computer 30 and displays the web page on the display device 22 of the client-hosting computer 20. If the displayed web page 40 contains a hypertext link 32, the user can activate that link, and the browser will retrieve the linked web page 44 from its intranet server-hosting computer 46, or from other servers to which access is permitted.

Figure 5A:
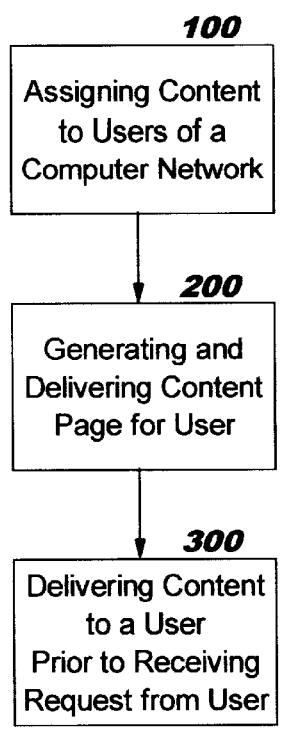
FIGS. 5A–5D schematically illustrate operations for carrying out various aspects of assigning, generating, and delivering content to intranet users according to the present invention.

Referring now to FIGS. 5A–5D, operations for carrying out various aspects of the present invention are illustrated. As illustrated in FIG. 5A, content is assigned to users of a computer network, such as an intranet (Block 100). Then, content pages are generated and delivered to users of the computer network in response to requests from users (Block 200). Content is also delivered to users prior to receiving requests for content from users (Block 300).

Assigning Content to Users of an Intranet

Figure 5B:
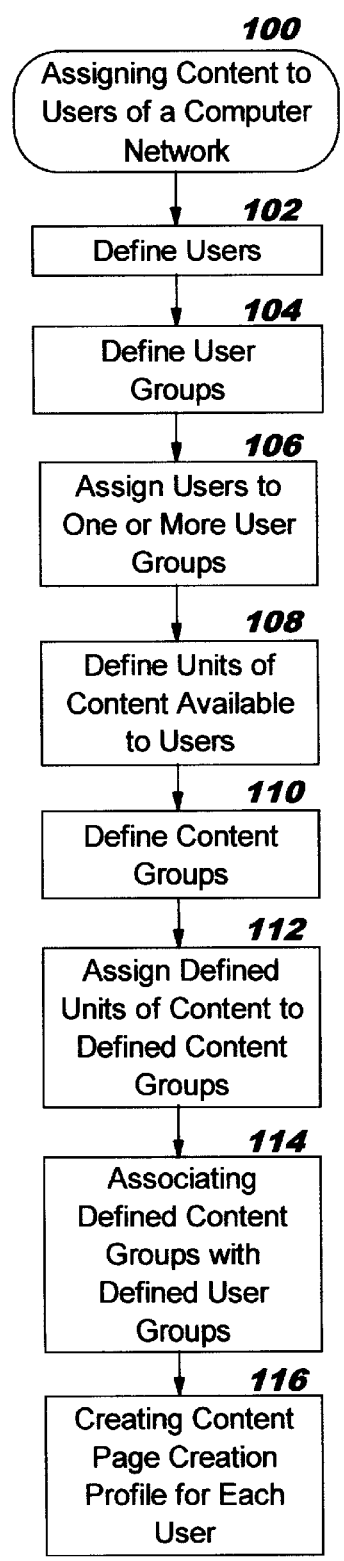

Referring now to FIG. 5B, operations for assigning content to users of a computer network (i.e., an intranet) (Block 100), according to the present invention, are illustrated. Initially, an intranet administrator defines the users of an intranet (Block 102) and also defines one or more user groups (Block 104). Next, the defined users are assigned to the defined user groups such that each of the defined user groups eventually has at least one of the defined users assigned thereto (Block 106).

Figure 6:
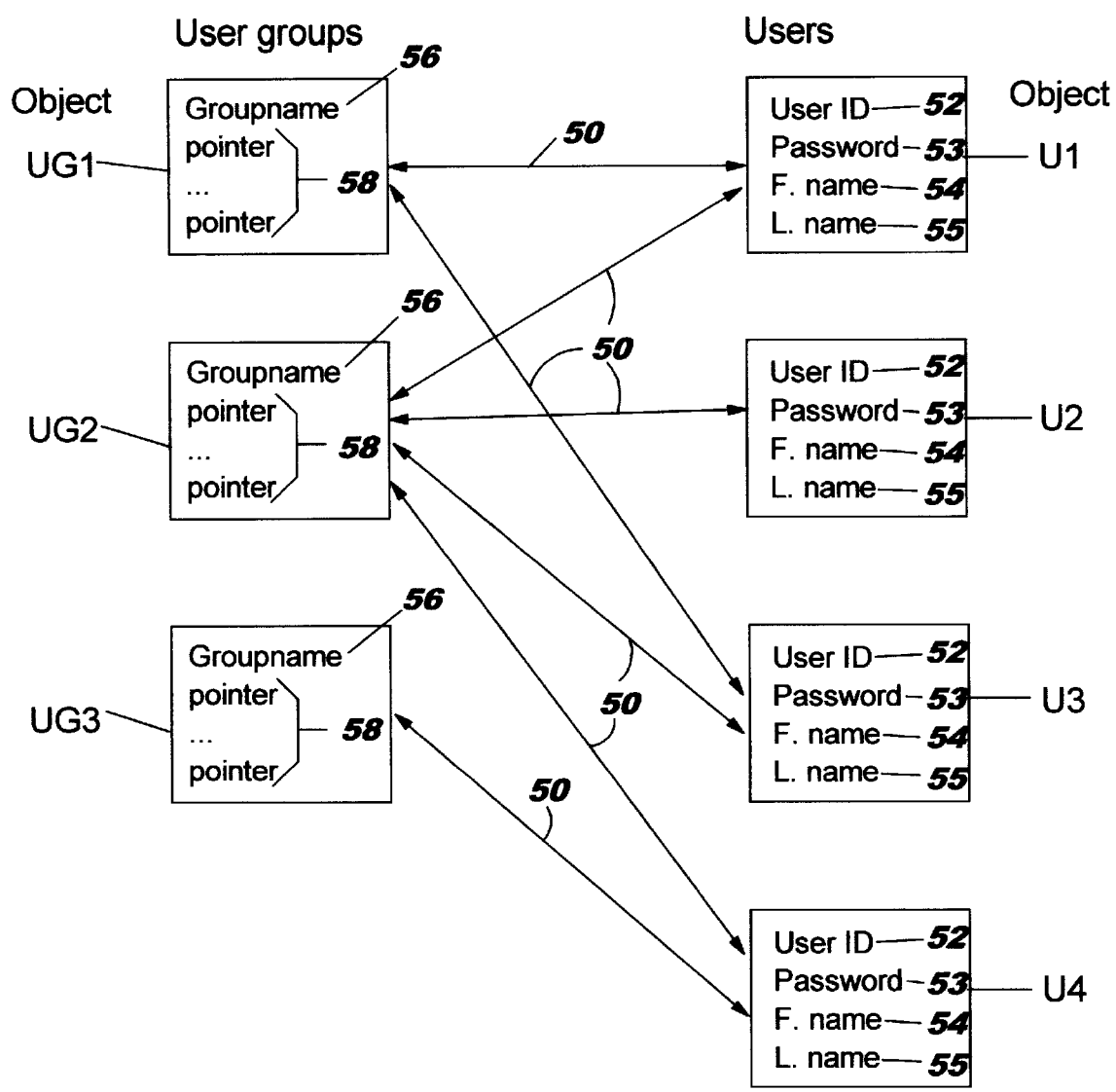
FIG. 6 illustrates four defined user objects which represent respective users of an intranet, three defined user group objects which represent respective defined user groups, and the relationships between the respective users and user groups, according to the present invention.

FIG. 6 illustrates four defined user objects (i.e., data structures) U1, U2, U3, U4 which represent respective users of an intranet. FIG. 6 also illustrates three defined user group objects UG1, UG2, UG3 which represent respective defined user groups. Arrows 50 indicate the assigned relationships between users and user groups (i.e., to which user groups each user has been assigned).

In the illustrated embodiment, the user objects U1–U4 each contain identification and authentication information about a respective user. In particular, as illustrated in FIG. 6, each user object U1–U4 may include a User ID 52, a user password 53, a user first name 54, and a user last name 55.

Additional fields that describe a user may be included within a user object, as well. It is understood that user objects, according to the present invention, may include various types of information, and are not limited to the illustrated types of information. For example, a user object may include a certificate read from a smartcard, a voiceprint, and the like. Preferably, each user object U1–U4 contains pointers to user groups UG1–UG3 to which the respective user is assigned. The word "pointer" can refer to any way of creating a relationship between objects, including database relations, DN pointers, data assertions, specialized Require/Allow/Forbid pointers in LDAP, and memory pointers in cached data. The direction of the pointers is irrelevant to the functioning of the system. For example, user groups can point to content groups, or content groups to user groups, or both based on several considerations, such as performance improvements, intuitive relationships in the schema, ease of updates, and ease of searches. The invention can work either way, but the preferred embodiment shows pointers going both directions. Also, to facilitate fast lookups, the user objects U1–U4 are preferably stored in a hash table keyed on a particular field, such as User ID 52. Objects, pointers, and hash tables are well understood by those skilled in this art and need not be described further herein.

The illustrated user group objects UG1–UG3 each contain the name of the user group 56, and pointers 58 to all user objects representing respective users in the user group. As would be understood by those skilled in this art, additional data, such as text describing each user group, may be included in each respective user group object UG1–UG3. Preferably, each user group object UG1–UG3 also includes pointers to content group objects CG1–CG3, as described below.

Referring back to FIG. 5B, an intranet administrator defines units of content available to users of a computer network (Block 108) and defines one or more content groups (Block 110). Next, the defined units of content are assigned to the defined content groups such that each of the defined content groups eventually has at least one of the defined units of content assigned thereto (Block 112).

Figure 7:
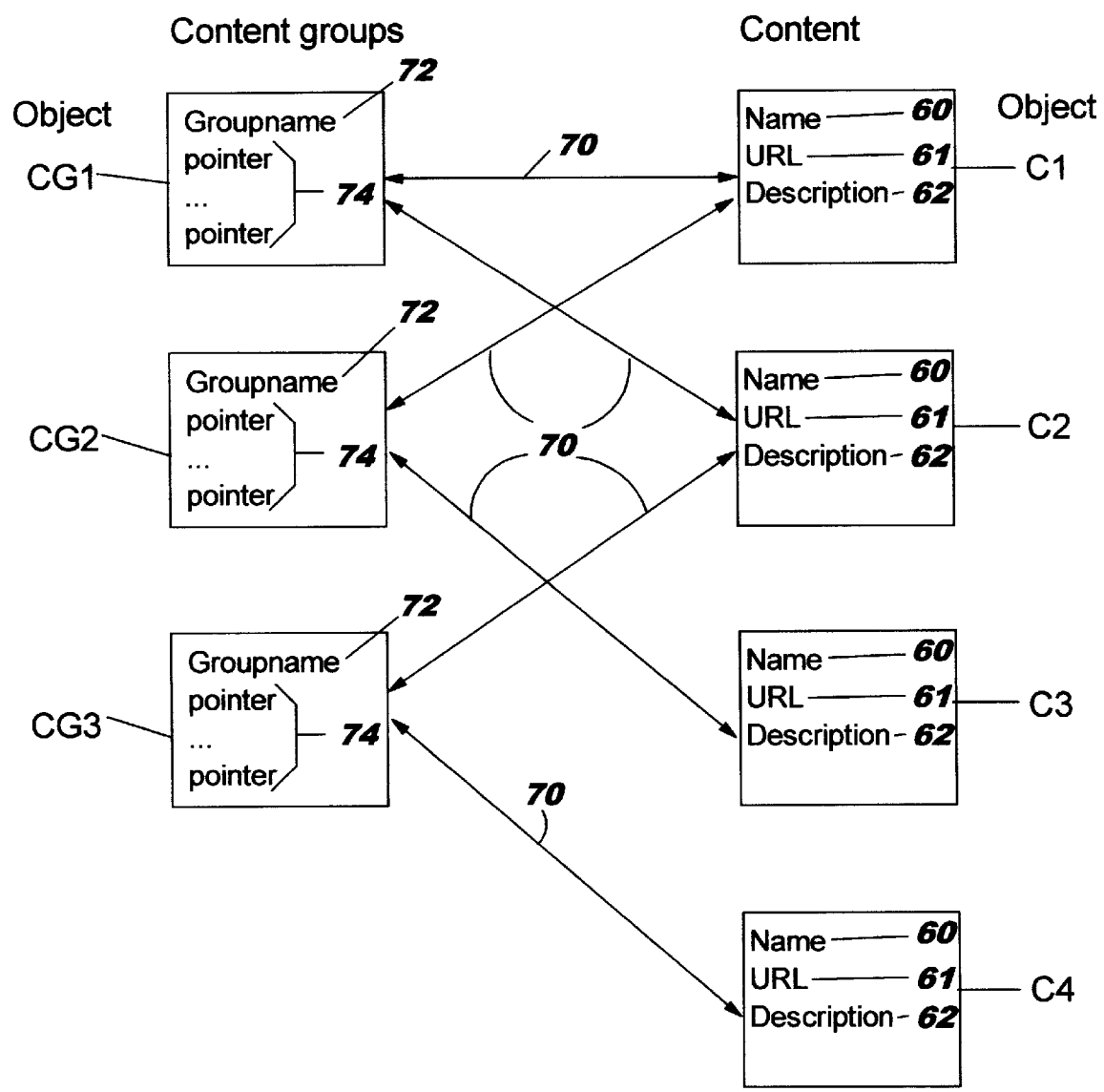
FIG. 7 illustrates four defined content objects which represent respective units of content available through an intranet, three defined content group objects which represent respective defined content groups, and the relationships between the respective units of content and content groups, according to the present invention.

FIG. 7 illustrates four defined content objects C1, C2, C3, C4, which represent respective units of content. FIG. 7 also illustrates three defined content group objects CG1, CG2, CG3 which represent respective defined content groups. Arrows 70 indicate the relationships between content objects and content groups (i.e., to which content groups a unit of content is assigned). In the illustrated embodiment, the content objects C1–C4 each include a name 60, URL 61, and description 62 for a respective unit of content. Additional fields that describe a respective unit of content may be included within a content object, as well. Preferably, each content object C1–C4 contains pointers to content groups CG1–CG3 to which the respective unit of content is assigned.

The illustrated content group objects CG1–CG3 include the name 72 of the content group, and pointers 74 to all content objects representing respective units of content assigned to a respective content group. As would be understood by those skilled in this art, additional data, such as text describing each group, or rules for tailoring the content for specific devices, may be included in each respective content group object CG1–CG3.

Figure 8:
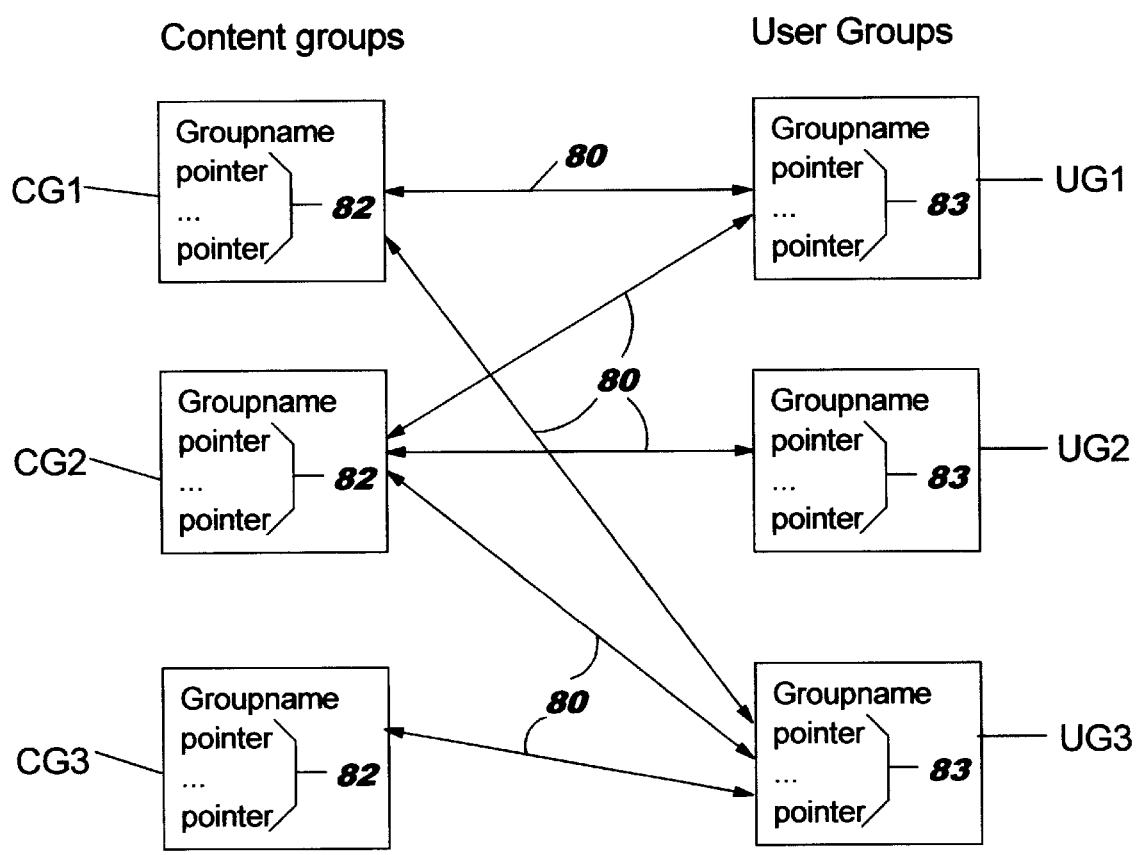
FIG. 8 illustrates the three defined user group objects of FIG. 6, the three defined content group objects of FIG. 7, and the associations between the respective user groups and content groups, according to the present invention.

Referring back to FIG. 5B, an intranet administrator associates the defined content groups with the defined user groups such that each of the defined user groups has at least one of the defined content groups associated therewith (Block 114). FIG. 8 shows the relationship of content groups and user groups. Arrows 80 indicate the relationships between content group objects CG1–CG3 and user group objects UG1–UG3 (i.e., to which user groups a content group is assigned). When a content group is assigned to a user group, a content group object (CG1–CG3) of the respective content group includes a pointer 82 to a user group object (UG1–UG3) of a respective user group. Similarly, a user group object includes pointers 83 to each content group object of respective content groups associated therewith.

It is understood that the relationships (e.g., relationships indicated by arrows 80 in FIG. 8) between content group objects and user group objects, according to the present invention, may be varied. For example, a relationship may be defined by the types of permissions that users within a user group have. As would be understood by those skilled in this art, such permissions may include, but are not limited to, "requires", "allows", and "forbids."

It should also be noted that users can create their own "personal" content groups and user groups that other users do not have access to. Accordingly, users can "subscribe" themselves to certain user groups in order to obtain access to various content. This "personal subscribing" may be in addition to the user groups to which a user is assigned by an administrator.

In a preferred embodiment, information about users is entered into user objects by an intranet or systems administrator. Alternatively, user information can be extracted automatically from an existing database, as would be known to those skilled in this art. Similarly, information about content may be entered into content objects by an intranet or systems administrator, or by users themselves. Alternatively, content information can be extracted automatically from a web crawling (searching) program, as would be known to those skilled in this art.

Preferably, information relating to users, user groups, content, and content groups is stored in a distributed directory such as one implementing the standard LDAP (lightweight distributed access protocol) specification. LDAP directories are well-known and need not be described further herein. Because LDAP directories are distributed, information relating to users, user groups, content, and content groups can be accessed efficiently from anywhere on a computer network in which the present invention is implemented.

Generating Content Page for User

Once users, user groups, content, and content groups have been assigned, a user can log-in to an intranet implementing the present invention and retrieve a content page containing content specifically generated for the user. Content page generation may begin when a user enters a particular URL into a browser to initiate log-in procedures. For example, employees of IBM's Austin, Texas laboratory may enter the URL http://login.austin.ibm.com to log-in to an intranet server, while employees of IBM's Almaden, California laboratory may enter the URL http://login.almaden.ibm.com to log-in to another intranet server. Preferably, by the standard operation of domain name server address resolution protocols, if a user simply types http://login from Almaden, the address will be resolved to login.almaden.ibm.com. If the name of a server implementing the present invention is standard (e.g., "login"), by typing the abbreviated version (i.e., http://login), a user preferably will log-in to the closest server configured to implement the present invention.

Figure 5C:
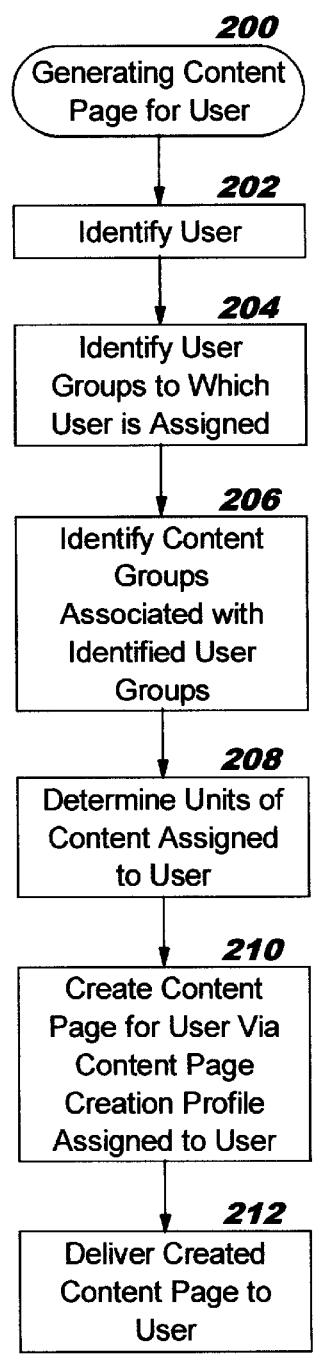

Referring now to FIG. 5C, operations for generating a custom content page for an intranet user (Block 200) are schematically illustrated. When a user logs-in to a server implementing the present invention, the server may respond with a challenge for a user ID and password. When the user responds, the server looks up the supplied user ID in a user object and identifies the user (Block 202). In addition, the server may authenticate the user by checking any submitted password, certificate, or other identifying token with information contained within a user object. Log-in procedures are well known in the art and need not be described further herein.

Once a user has been identified and authenticated, user groups to which the user is assigned are identified (Block 204). The user object, for example U1, for the identified user is retrieved from a hash table using data provided by the user, such as User ID. As described above, the user object contains pointers to user group objects for each respective user group of which this user is a member. In the present example, U1 would include pointers to UG1 and UG2. Each of these pointers is followed, yielding the user group objects for each user group of which this user is a member. Thus, in the present example, UG1 and UG2 would be identified.

In response to identifying user groups to which the user is assigned, content groups associated with the identified user groups are then identified (Block 206). Each user group object for a respective identified user group contains one or more pointers to content group objects which represent respective content groups associated therewith, as described above. By following these pointers, a list of content groups associated with this user can be obtained. Thus, in the present example, content group objects CG1 and CG2 would be included in the list of content groups.

Units of content assigned to the user are then determined (Block 208). Each content group object for a respective content group contains a list of pointers to content objects representing units of content assigned to the user (via content groups and user groups), as described above. By following these pointers, a list of units of content assigned to the user can be produced. This list of assigned units of content is then used to create a customized content page (Block 210) to be delivered to the user (Block 212). Thus, in the present example, content objects C1–C3 would be identified.

A user's customized content page is preferably a hypertext document containing URLs to assigned units of content. A content page may also display the descriptions of each unit of content, along with the associated URLs. According to another embodiment of the present invention, actual units of content may be embedded within a user's content page. Additionally, links to applications that can be executed within a separate browser window may also be provided within a content page.

Preferably, the units of content on a user's content page are arranged according to a content page creation profile assigned to the user. A content page creation profile may designate a "mandatory display" area of a content page that always displays certain assigned units of content. In addition, a content page creation profile may designate one or more "user-modifiable" areas of a content page that allow a user to modify what units of content are displayed within a content page. Accordingly, once a user's content page is created, the user may add or delete units of content displayed within these user-modifiable areas. However, the user will not be able to modify the units of content displayed within mandatory areas.

Content page creation profiles according to the present invention may also be utilized to allow for the different roles of a user. Accordingly, a user may want to create subsets of content corresponding to the different roles the user may have within an enterprise. For example, a software product release manager might want a content page creation profile that corresponds to information about a particular software product. In addition, the same software product release manager might want a different content page creation profile that corresponds to his/her role as a manager, wherein general information for managers is provided in a content page generated therewith.

In addition, a user may access an intranet via devices having differing capabilities such as, but not limited to, desktop computers, handheld personal digital assistants (PDAs), smart-phones, or subnotebooks. According to the present invention, separate content page creation profiles may be utilized for each type of device used by a user to connect to an intranet. In addition, separate content groups can be utilized for different devices. These content groups can include appropriate rules for transforming content into a format best suited for a particular device. Storing rules with a content group associated with a device allows the transformation to be done in advance of a request from a specific device. During the various user identification and authentication steps (Block 202), the type of device being used by a user can be identified and the content page creation profile associated with the device can be utilized to generate the content page for the user.

Delivering Content to a User Prior to Receiving Request From User

Figure 5D:
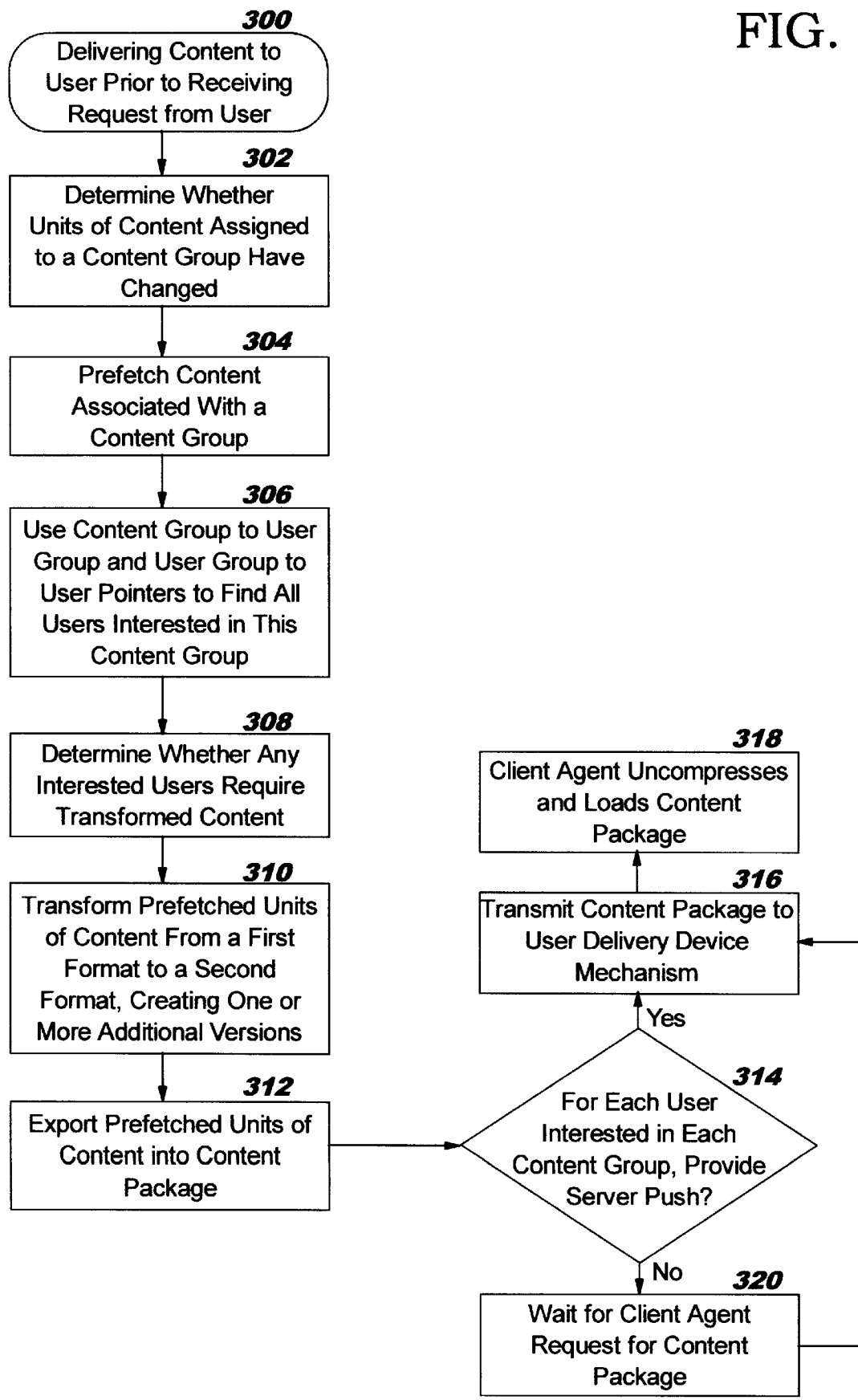

Referring now to FIG. 5D, operations for delivering content to a user prior to receiving a request from the user for the content are schematically illustrated. Operations may include: determining whether units of content assigned to a content group have changed (Block 302); prefetching content associated with a content group (Block 304); using content group to user group pointers and user group to user pointers to find all users interested in the content group (Block 306); determining whether any interested users require transformed content (Block 308); transforming prefetched units of content from one format to another (Block 310); and exporting prefetched units of content into content packages (Block 312.)

For each user interested in a content group, the timing of delivery to the client device depends on whether a client-pull or server-push mechanism is used to convey the information. With a client-pull mechanism, servers hold information to deliver to the client when the client requests an update. The normal browser request for pages is an example of a client-pull mechanism. Another example would be waiting for the client to log on, and then downloading all of the content packages associated with the user's page. PointCast® (PointCast, Inc., Sunnyvale, Calif.) is another example of a client-pull mechanism. With a server-push mechanism, the server determines the information that belongs on the client and downloads it without being asked, for example, as soon as the client and server become connected. Microsoft's Channel Definition Facility and Marimba's Castanet (Marimba, Inc., Mountain View, Calif.) are both examples of server-push techniques. Both client-pull and server-push techniques are well-known in the art and need not be described further herein. However, the invention may work with either method. A particular implementation of the server agent may support one or both techniques. If both, it must have the ability to decide which technique to use for a given user (Block 314).

Figure 9:
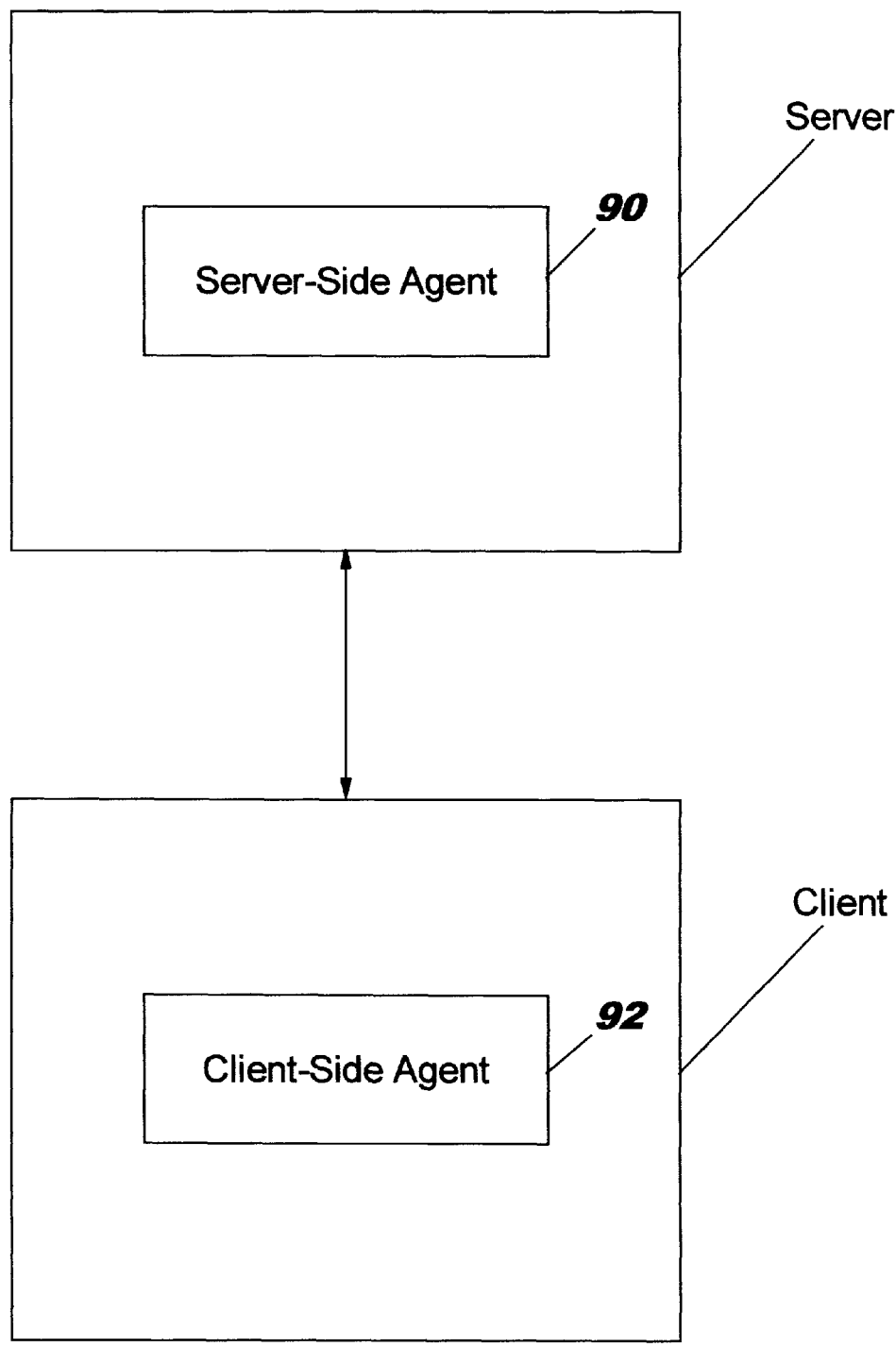
FIG. 9 illustrates a server-side agent and a client-side agent for performing various operations according to the present invention.

According to one embodiment of the present invention, an agent is configured to prefetch units of content assigned to a content group (Block 304), to export the prefetched units of content into a content package (Block 312), and to transmit the content package to a user device (Block 316). Preferably, a server-side content agent 90 (FIG. 9) is programmed to prefetch all units of content associated with each content group (Block 304), including content accessible from links inside each unit of content. The server-side content agent 90 then exports the retrieved units of content into packages (Block 312), such as Channel Definition Format (CDF) files or zip files. Compression of content packages may be utilized. Compressed packages are well known by those skilled in this art and need not be described further herein. It is to be understood that compression of prefetched units of content is not required but may be implemented to help reduce network traffic.

The present invention can reduce the number of independent fetches from intranet servers for information that administrators identify as widely useful to their company members, replacing them with local transmissions of possibly compressed collections of information. Thus, instead of every user individually fetching every HTML page, applet, or image file directly from the various hosting servers, a server-side agent performs fetches once for all users associated with a particular content group. The information is then transmitted to the specific users via possibly compressed files from a nearby server, in place of numerous separate HTTP requests to geographically distributed servers.

Preferably, a client-side agent 92 (FIG. 9) is configured to retrieve information about the content groups associated with a specific user. The client-side agent 92 uses the retrieved information to control retrieval of content packages needed by a particular user. An examples of a mechanism for controlling the retrieval of content packages includes the Microsoft channel protocol, which delivers CDF files from a server-side content agent to a client-side agent. Alternatively, an IBM eNetwork Web Express package file can be downloaded from a server-side content agent on a side-band socket and imported into an IBM eNetwork Web Express client cache.

Preferably, before retrieving information, a client-side agent 92 determines whether a user machine already has the content packages associated with all content groups for users of the machine. Since the content groups associated with a particular user can change over time, an agent can be programmed to check periodically, or every time a user logs-in to an intranet server implementing the present invention, or during low usage times. Subsequent user access of content can occur with minimal network traffic since most of the content has been pre-fetched and loaded on the user's computer.

According to a preferred embodiment of the present invention, a server-side agent 90 is configured to determine whether units of content assigned to a content group have changed (Block 302). If such changes are detected, the server-side agent is also configured to automatically update a respective compressed package to include the changes. Preferably, a determination is made whether a user device connected to a computer network implementing the present invention contains a current version of a compressed content package. The mechanism for knowing whether the client already has the package is to reduce network traffic and need not be incorporated with the present invention. If no such mechanism exists, the server assumes that the client does not have the package and thus will always download it. If a user device does not contain the latest version of a compressed content package, the compressed content package is transmitted to the user device.

The present invention can also perform various content transformations from one format to another to tailor retrieved units of content for different user devices (Block 308). For example, some user devices may only have gray scale image display capabilities. Accordingly, transporting color images to such a device would be a waste of network resources. By transcoding a color image into a gray scale image, the amount of data that needs to be transmitted to a user device, and the processing that a user device may have to perform to display the image, can be reduced significantly. Performing such content transformations during off-peak hours can reduce the time that users have to wait to receive the appropriate version for their devices and can reduce demands on intranet servers during peak hours. In addition, content transformation can facilitate efficient use of server processing power by performing processor and numerically intensive data transformations with machine cycles that often go unused.

For a client machine that hosts multiple users, such as a work station that implements a network computer model, a client-side agent can fetch the union of content pages needed by various users of a computer. Content pages that are needed by multiple users can be retrieved once and reused for different users. A client-side agent can also manage the set of content pages on a computer based on factors such as when a content page was last used, or on frequency of use of a content page. Accordingly, if a user computer runs out of disk space for storing content pages, the content pages that have not been used recently, or with a certain level of frequency, can be deleted.

It will be understood that each block of the flowchart illustrations of FIGS. 5A–5D and combinations of blocks in the flowchart illustrations of FIGS. 5A–5D, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The present invention is preferably written in an object oriented programming language such as Java® (Sun Microsystems, Mountain View, Calif.). However, other programming languages including, but not limited to, C, C++, and Smalltalk may be utilized. The software for carrying out the various operations and functions of the present invention resides within one or more intranet servers. User devices for accessing an intranet server implementing the present invention only require a web browser. For accessing customized content, according to the present invention, no client-side software, other than a standard web browser is required. For data compression aspects of the present invention, client software should have the ability to uncompress content packages and the ability to cache content packages in order to utilize prefetching aspects of the present invention. Accordingly, some aspects of the present invention can be expanded and enhanced with the inclusion of client side software routines.

EXAMPLE

FIGS. 10–30, described below, represent exemplary users interfaces for assigning content to users of a computer network, according to an embodiment of the present invention.

Figure 10:
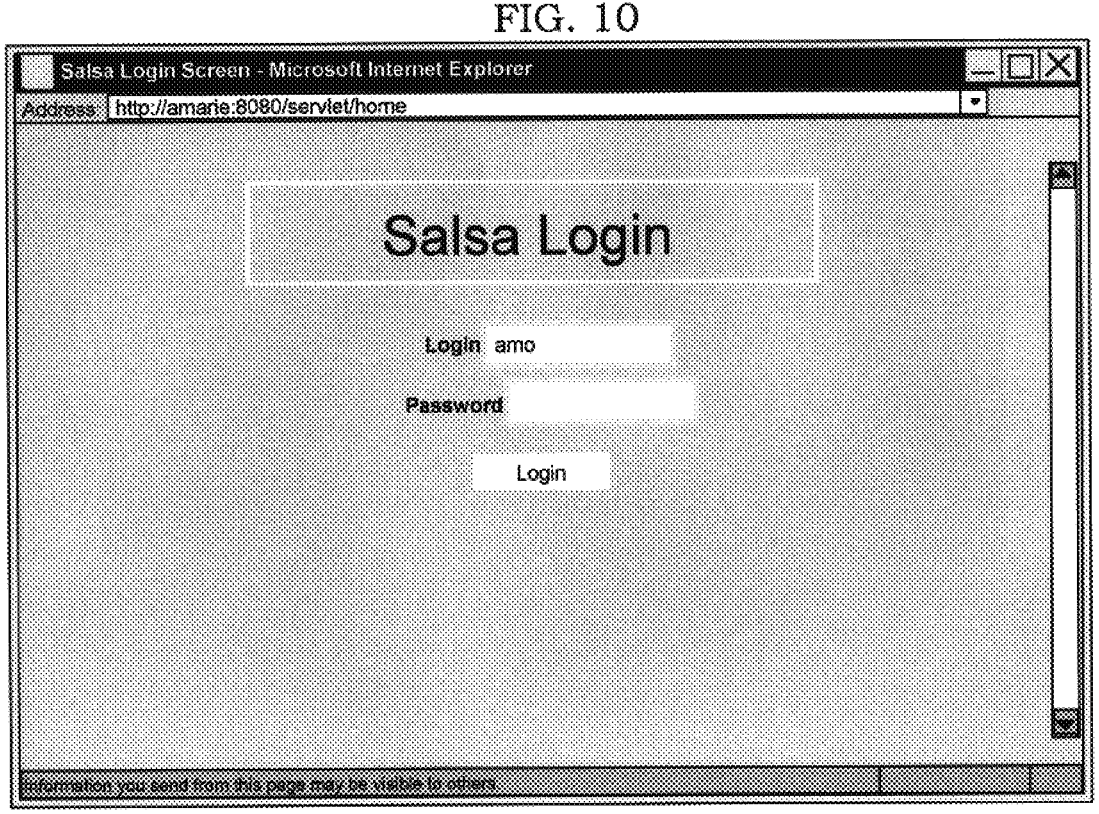

FIG. 10 represents an initial login screen all users are presented with. The login screen can be obtained, for example, via the IBM intranet by going to login.raleigh.ibm.com.

Figure 11:
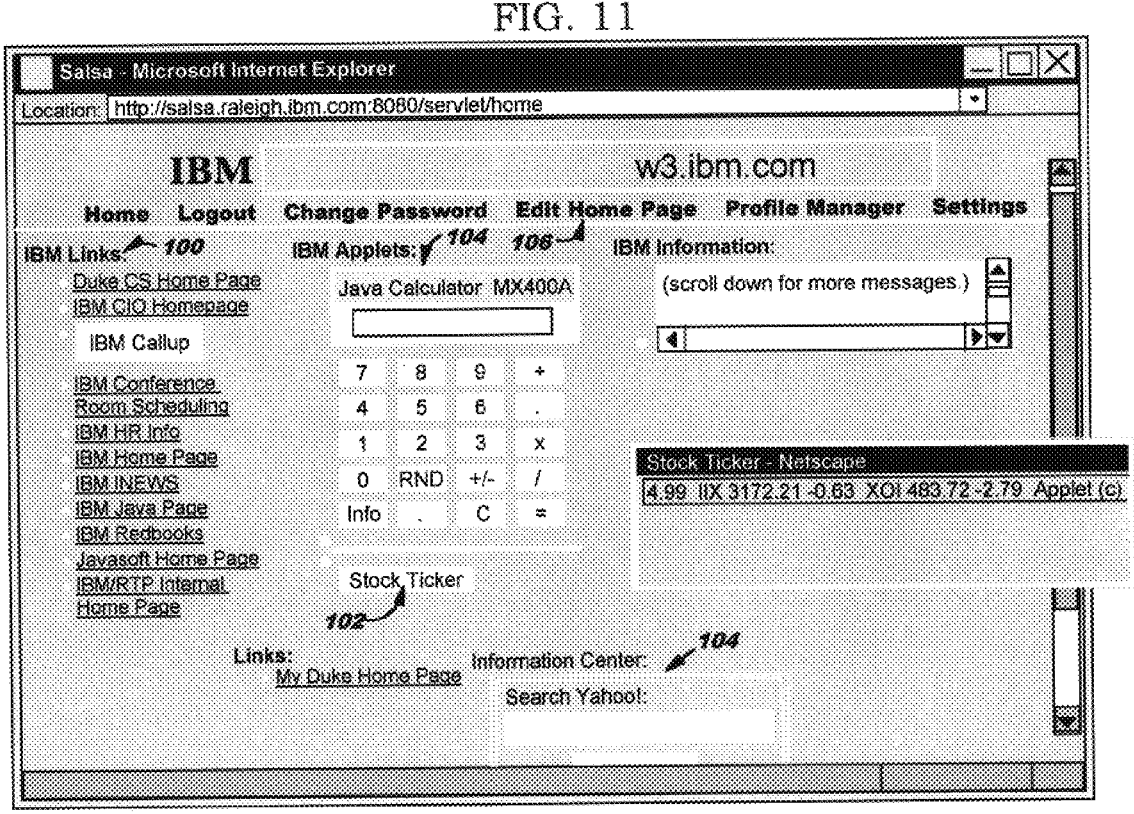

FIG. 11 represents a sample content page that is presented to the user "amo" who logged in via FIG. 10. A user profile "Office" controls the display and arrangement of content. Note that the user "amo" clicked on the Stock Ticker button, which brought the stock ticker applet up in a separate window. Content is accessible to the user "amo" via URL "links" 100 (i.e., "Duke CS Home") listed on the content page, via applications launched from a button 102 (i.e., the Stock Ticker applet) on the content page, and via applications embedded 104 within the content page (like the Java calculator and Yahoo! search).

Figure 12:
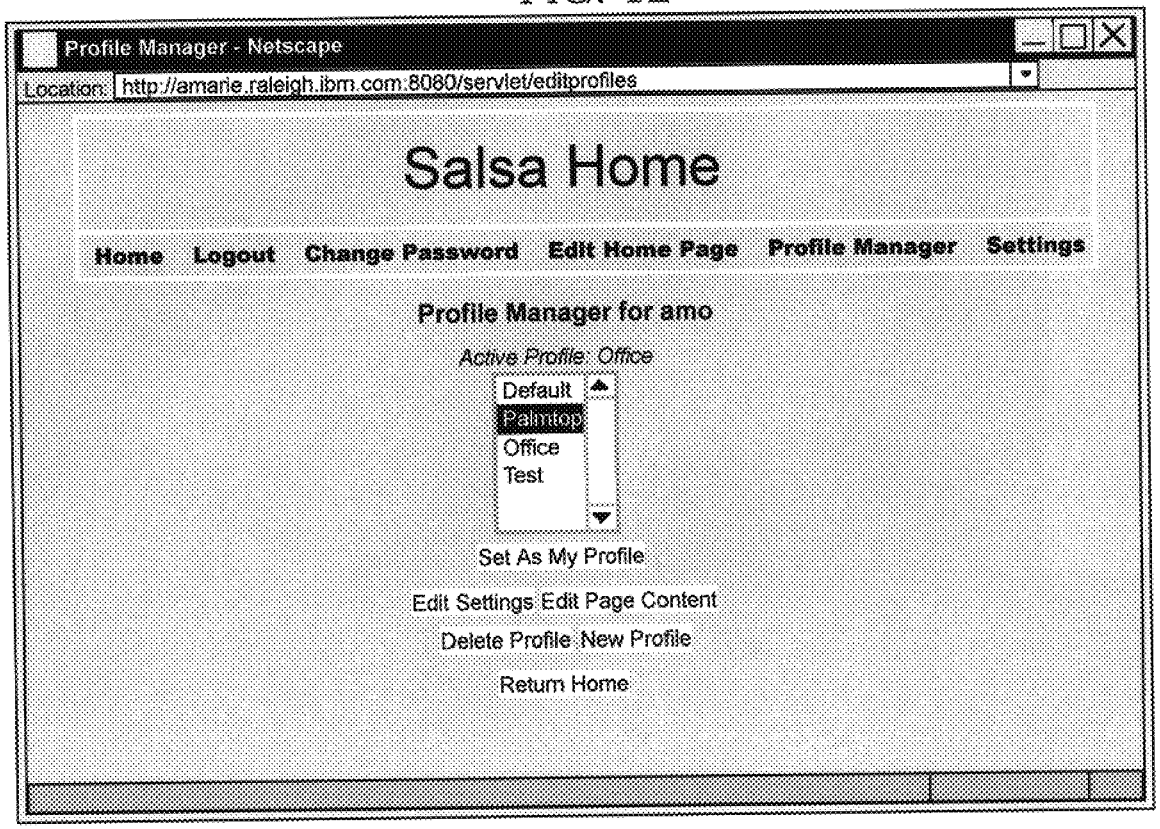

FIG. 12 illustrates that a user can change which profile is active, which in turn determines how the content page is displayed. Profiles can be configured for different job functions, locations, or machine types. The user has highlighted the profile "palmtop" in order to change the active profile to one configured for accessing content via a palmtop device.

Figure 13:
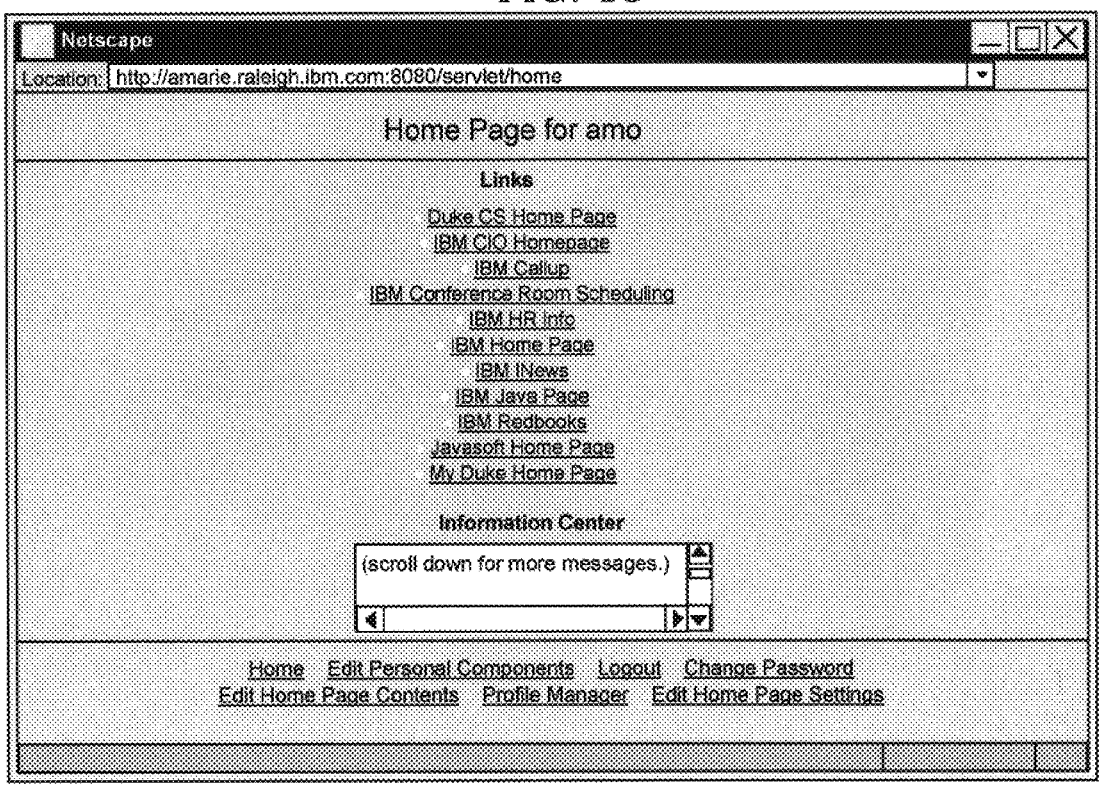

FIG. 13 illustrates the content page for the user "amo" after the Palmtop profile is made active via the user interface of FIG. 12. Note that this content page is substantially different from the content page displayed in FIG. 11. The image map has been removed, there are no Java applets present, the colors are different, and the layout is different. The content page illustrated in FIG. 13 also contains different content than the content page of FIG. 11 which was I produced via the "Office" profile. For example, the Yahoo! search component is not present in the content page of FIG. 13. Additionally, all content in FIG. 13 is displayed as a URL link. The content page of FIG. 13 has a simple layout in order to make the content page load very quickly and with little data transferred.

Figure 14:
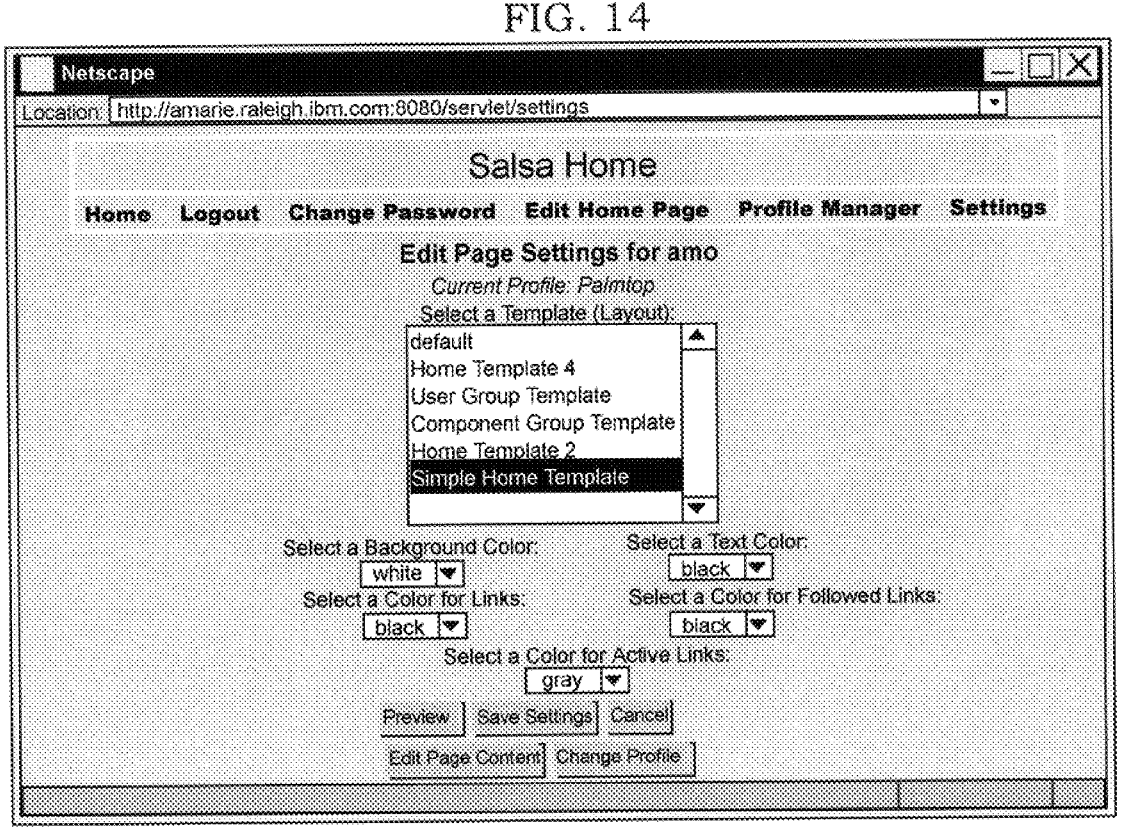

FIG. 14 illustrates how the settings are configured for the Palmtop profile. A user obtains the user interface of FIG. 14 by clicking on "Edit Home Page Settings" on the user's content page (106 FIG. 11).

Figure 15:
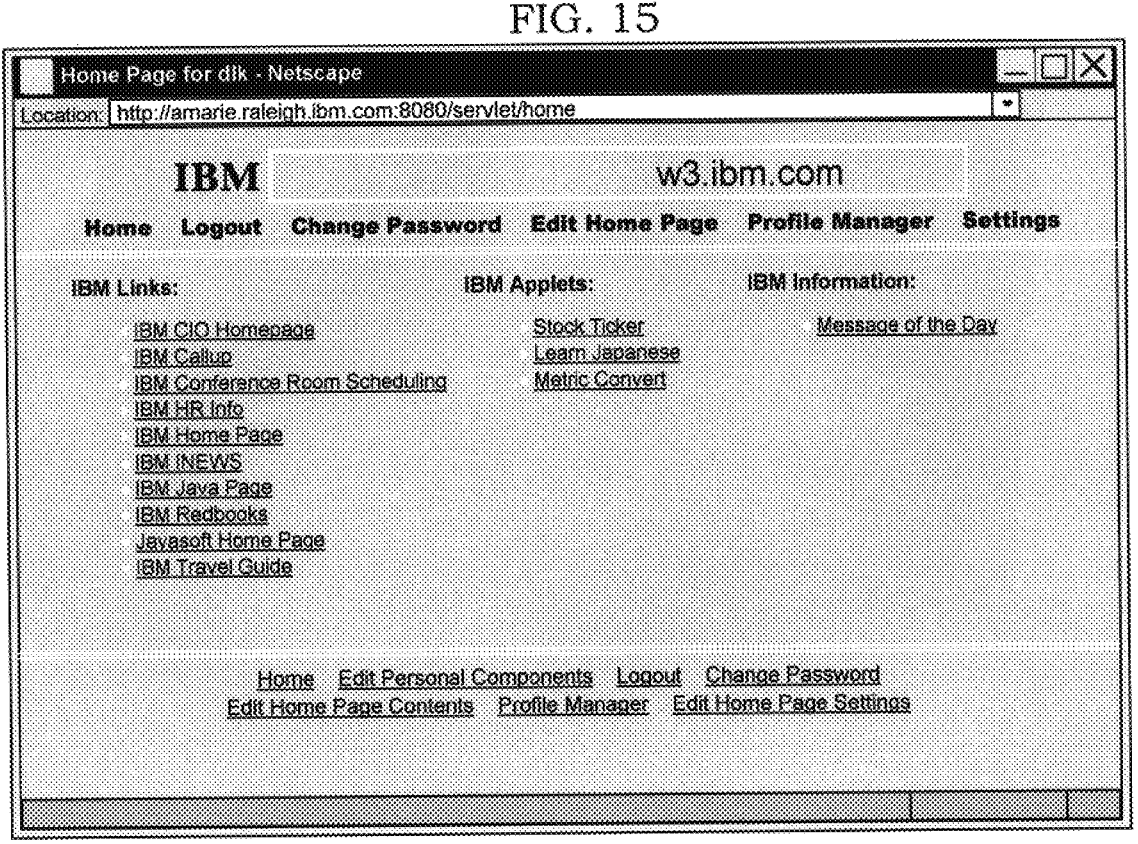

FIG. 15 illustrates a content page for another user "dlk" who has logged on. Note that the content and settings of this page are different than that for the user "amo". For example, "dlk" is not in the Duke students user group, so the Duke CS Home Page link does not show up on this content page.

Figure 16:
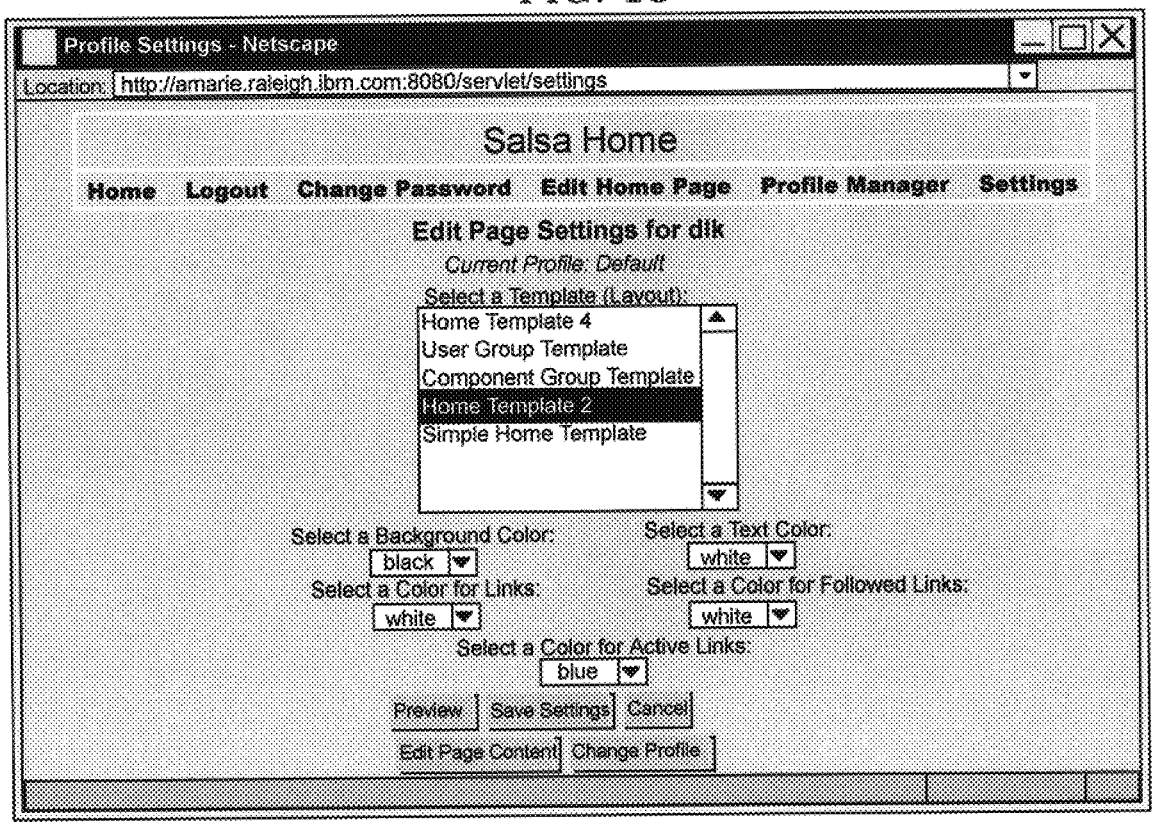

FIG. 16 illustrates a default profile for users. User profiles inherit the Default settings unless a user changes them via "Edit Settings" and "Edit Content" user interfaces. In FIG. 16, the user dlk is changing the default template to "Home Template 2." FIG. 16 also contains a preview function that lets the user see changes made without saving them.

Figure 17:
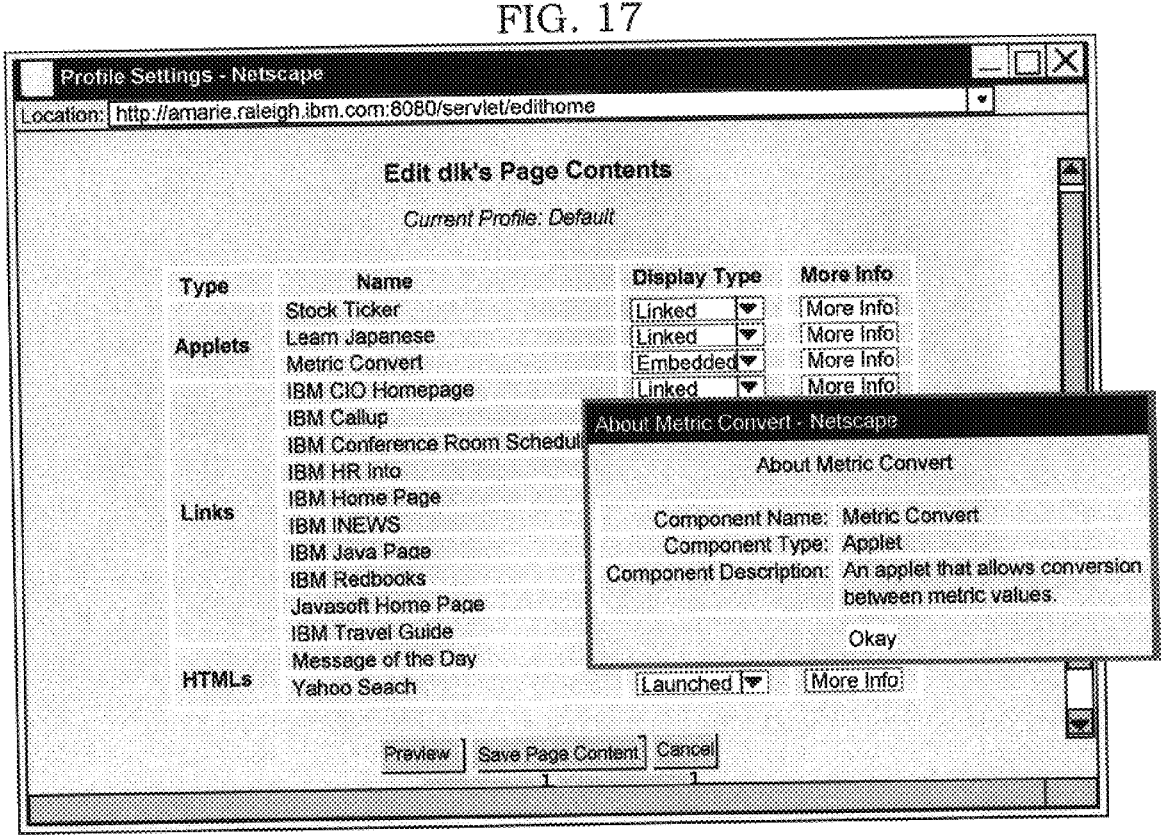

FIG. 17 illustrates an "Edit Home Page Content" user interface for user "dlk." This user interface is used to control what content is displayed on "dlk's" content page, and how content is displayed. A user cannot see content on this user interface unless the user is either allowed or required to see the content. The options are Linked, Launched (as a button), Embedded, and Not Shown (an option only available if the user is allowed, but not required, to see a component). The user has clicked on the "More Info" button for the unit of content "MetricConvert" to see a description of this unit of content.

Figure 18:
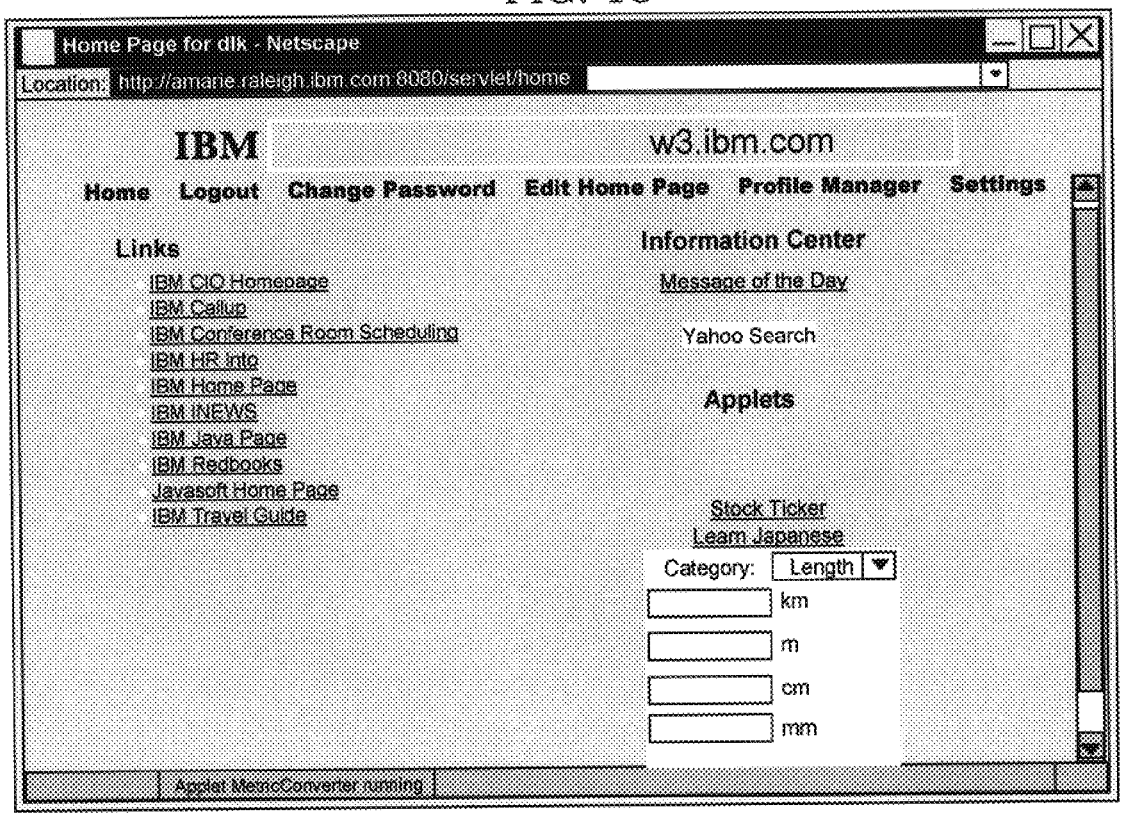

FIG. 18 illustrates what the content page for user "dlk" looks like after the changes made in FIG. 13 have taken effect.

Figure 19:
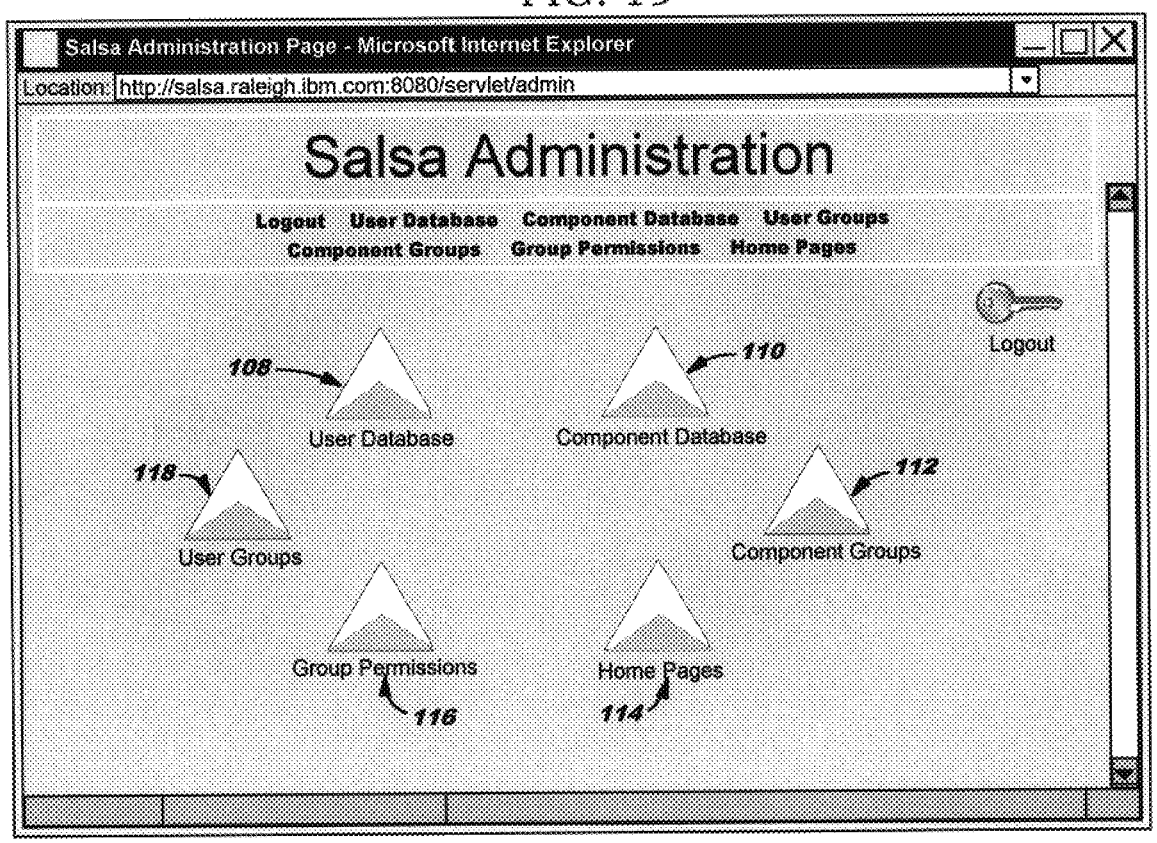

FIG. 19 illustrates a content page for an administrator of an intranet incorporating the present invention. The User Database 108 lets the administrator add and edit users. The other illustrated options include Component Database 110, Component Groups 112, Home Pages 114, Group Permissions 116, and User Groups 118. Each of these functions will be described below.

Figure 20:
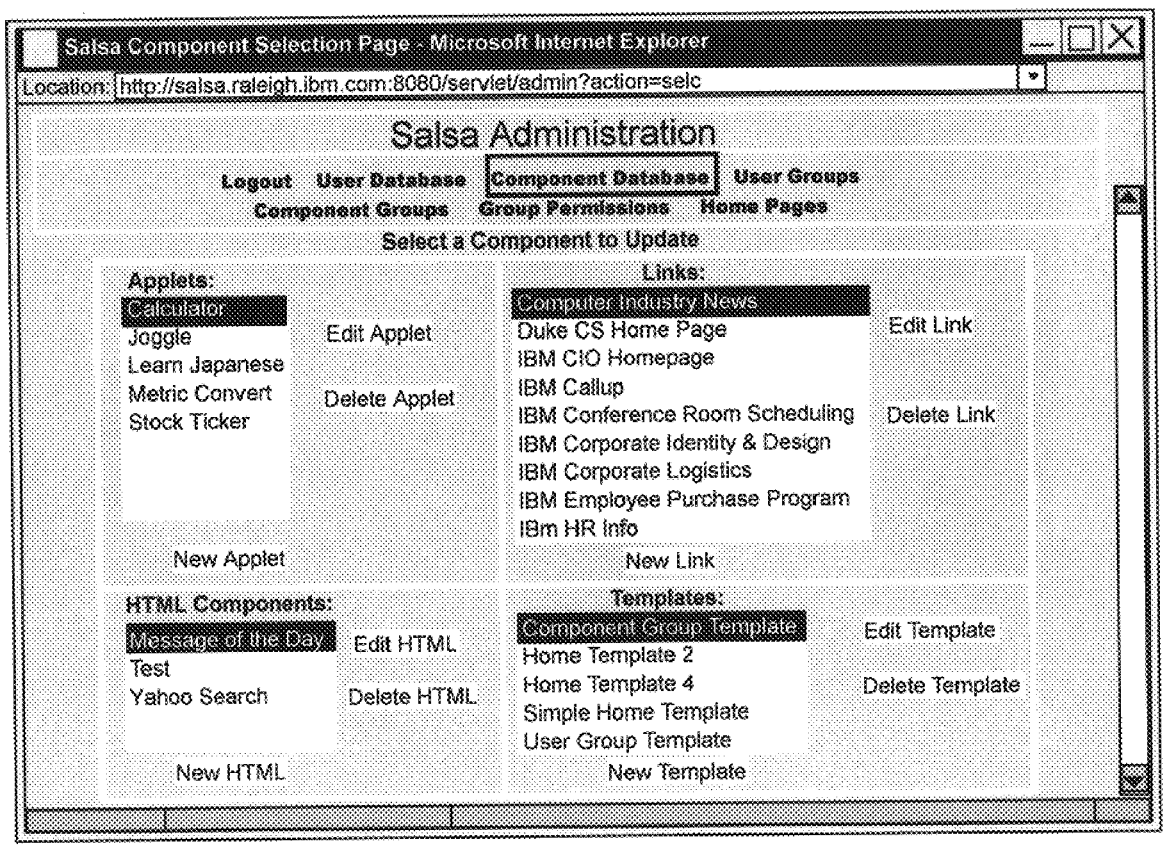

FIG. 20 illustrates the component database administration area (accessed via option 110 in FIG. 19). There are different component types (i.e., units of content) based on their HTML characteristics. For example, applets have a height, width, codebase, and the like, so fields are provided for that information. Links, on the other hand, only have a name, description, and URL.

Figure 21:
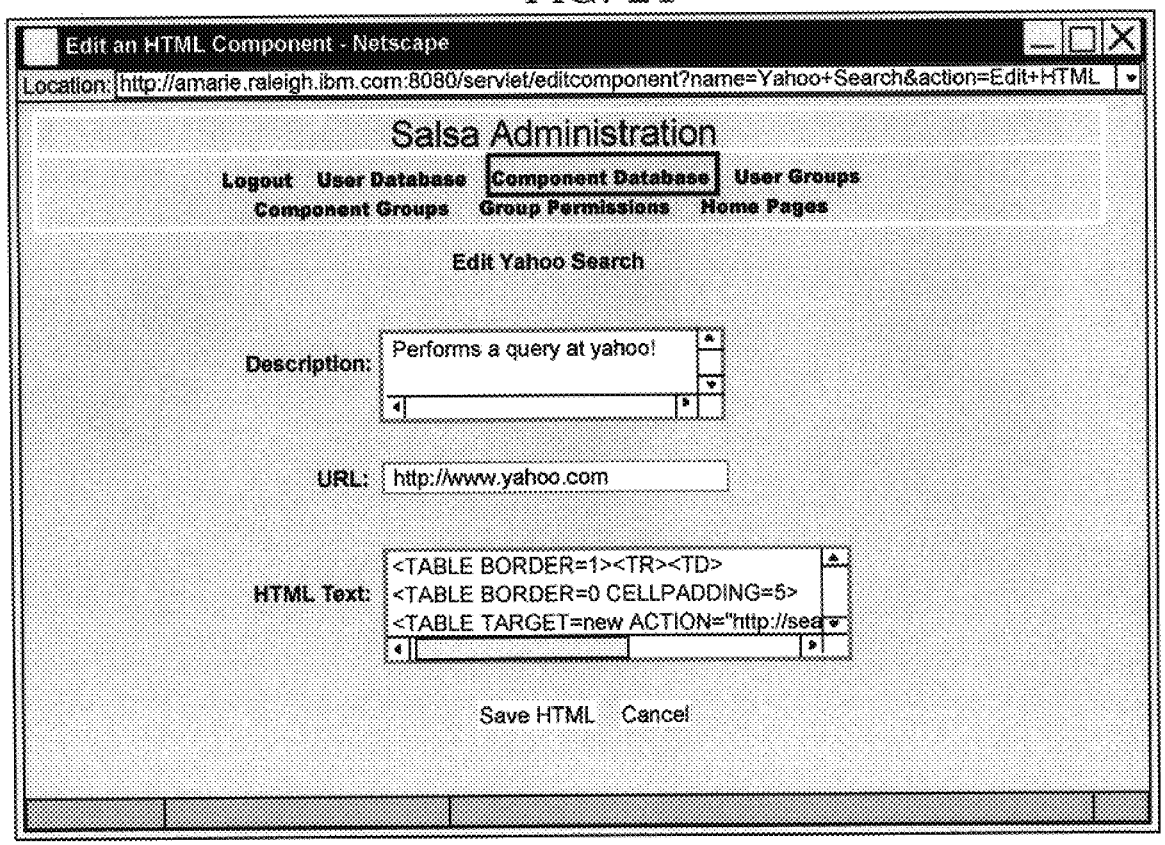

FIG. 21 illustrates what an administrator would see after clicking on "Yahoo Search" and then "Edit HTML" in FIG. 20.

Figure 22:
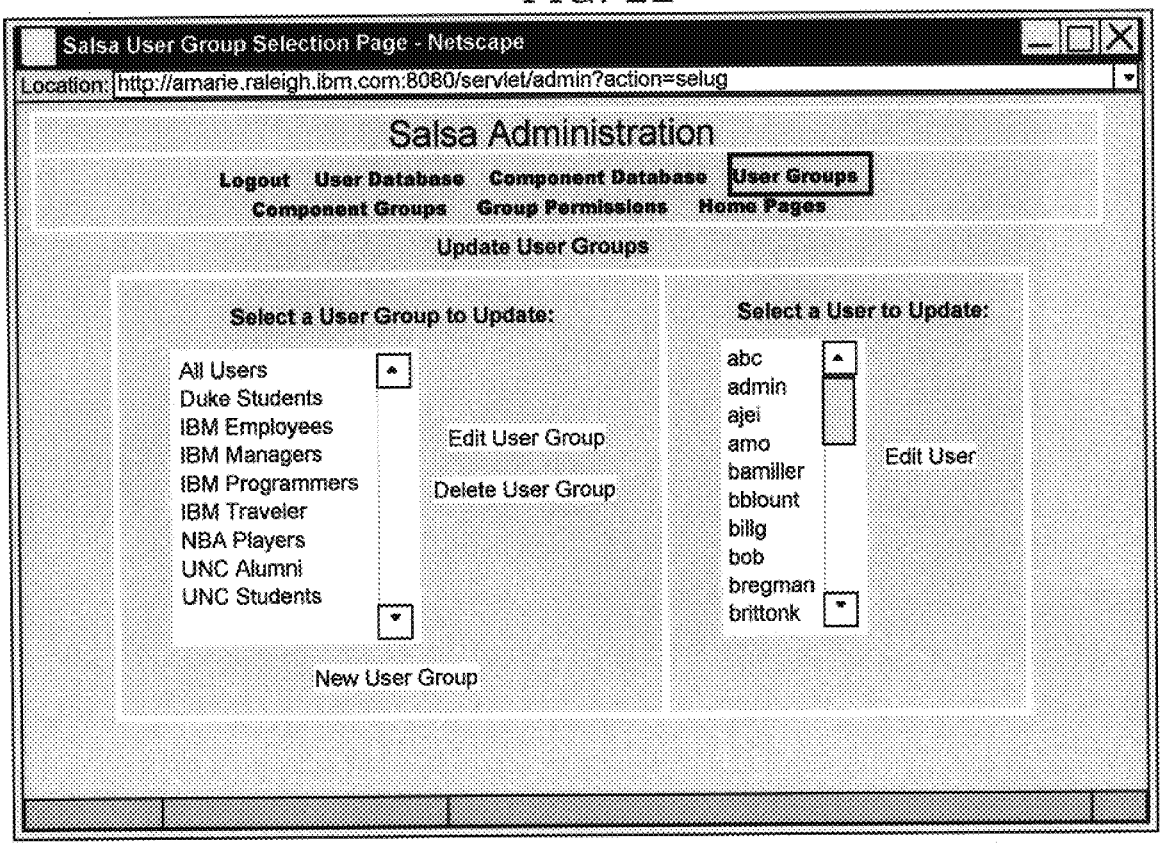

FIG. 22 illustrates the user group administration area (accessed via option 118 in FIG. 19). Two views of group membership are provided. From the group view, a list of the group's members is provided. From the user view, a list of what groups the user belongs to is provided. From the group view an administrator could also designate a group as a subgroup of another group.

Figure 23:
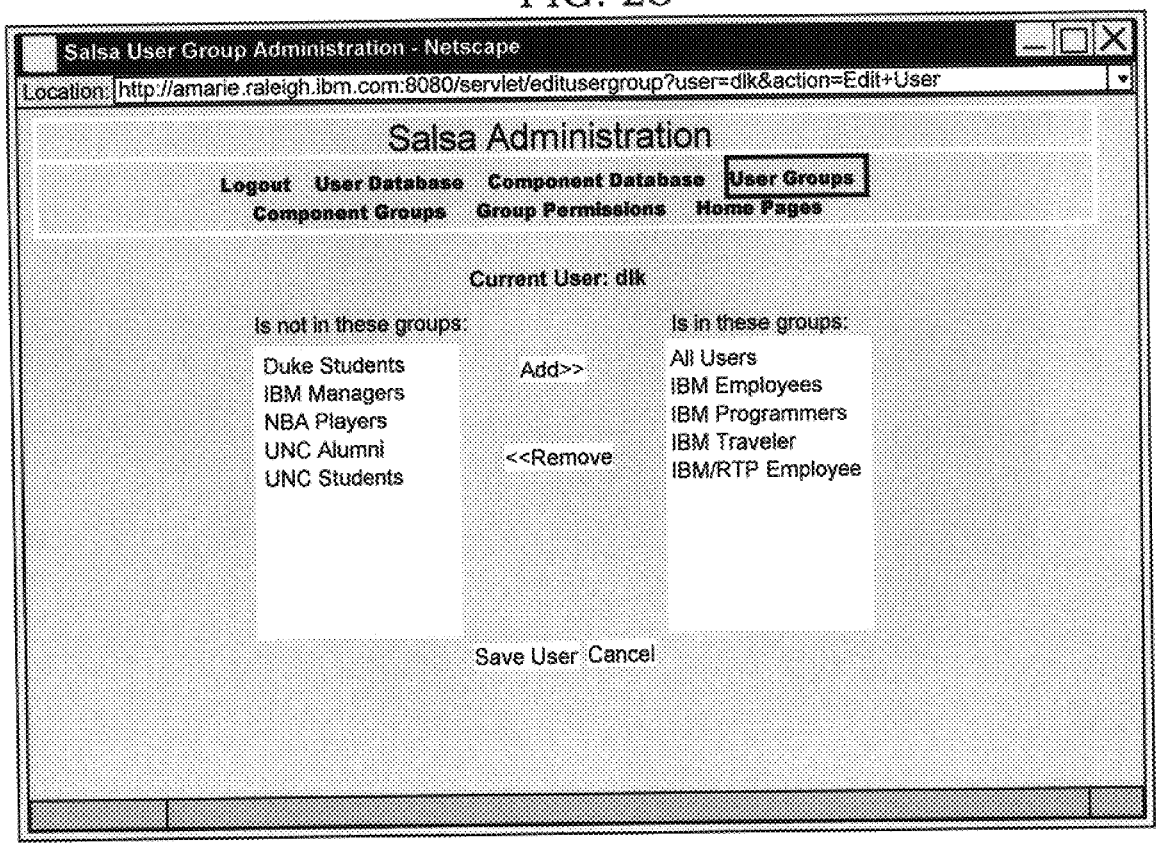

FIG. 23 illustrates what an administrator would see after clicking on "dlk" and then "Edit User" in FIG. 22.

Figure 24:
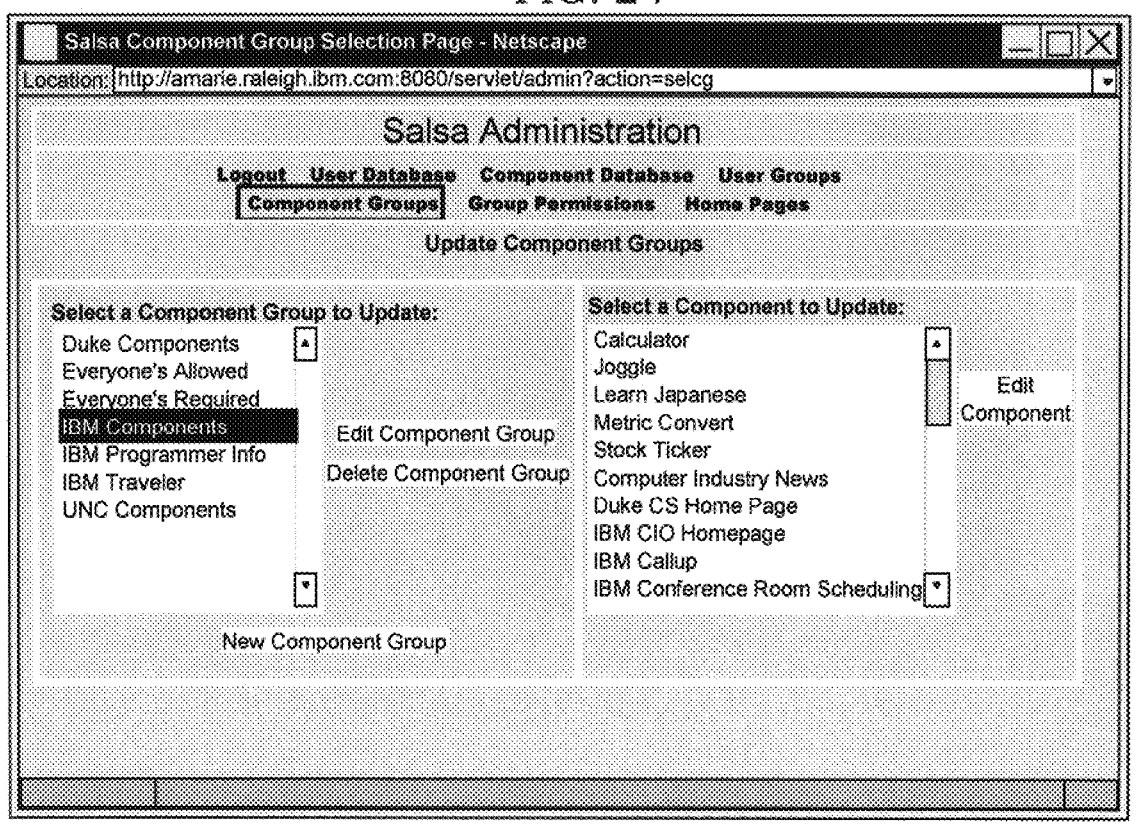

FIG. 24 illustrates the component group administration area (accessed via option 112 in FIG. 19). Two views of group membership are provided.

Figure 25:
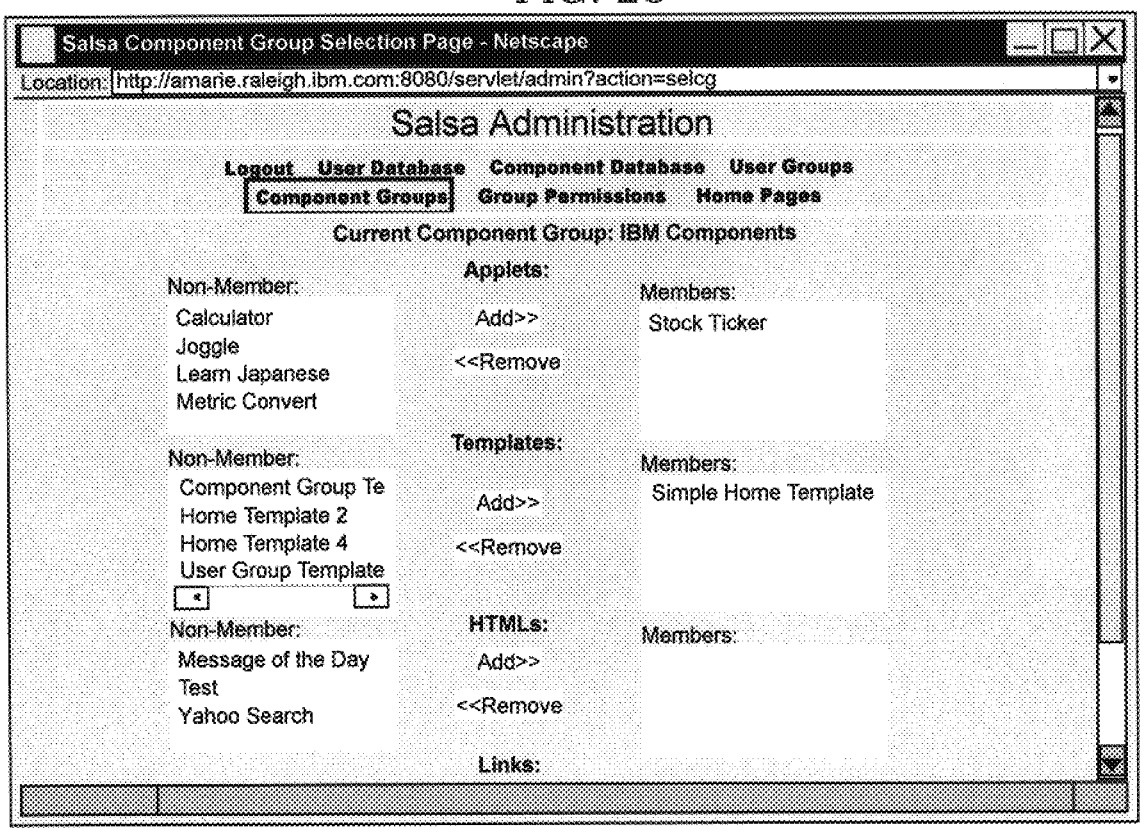

FIG. 25 illustrates what an administrator would see after clicking on "IBM Components" and "Edit Component Group" in FIG. 24.

Figure 26:
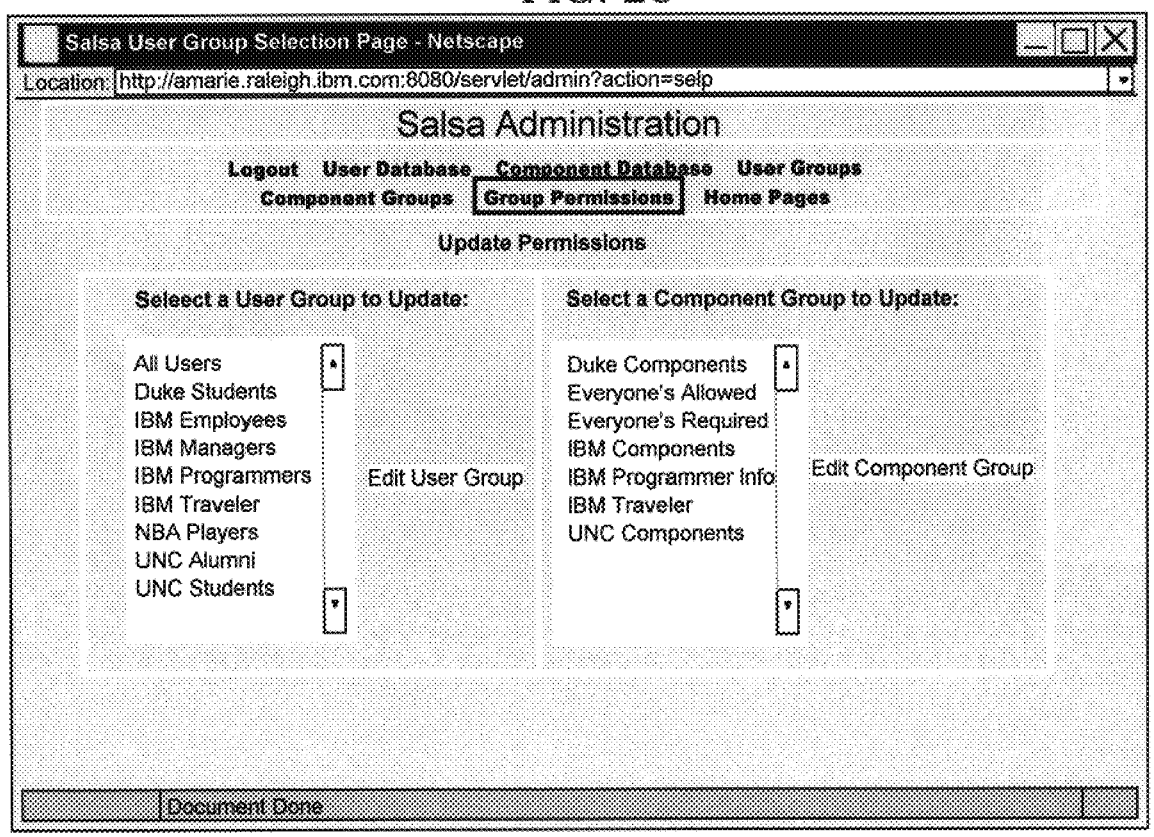

FIG. 26 illustrates the group permissions administration area (accessed via option 116 in FIG. 19). This user interface is used by an administrator to associate user groups with component groups (i.e., content groups). There are two available views of the association.

Figure 27:
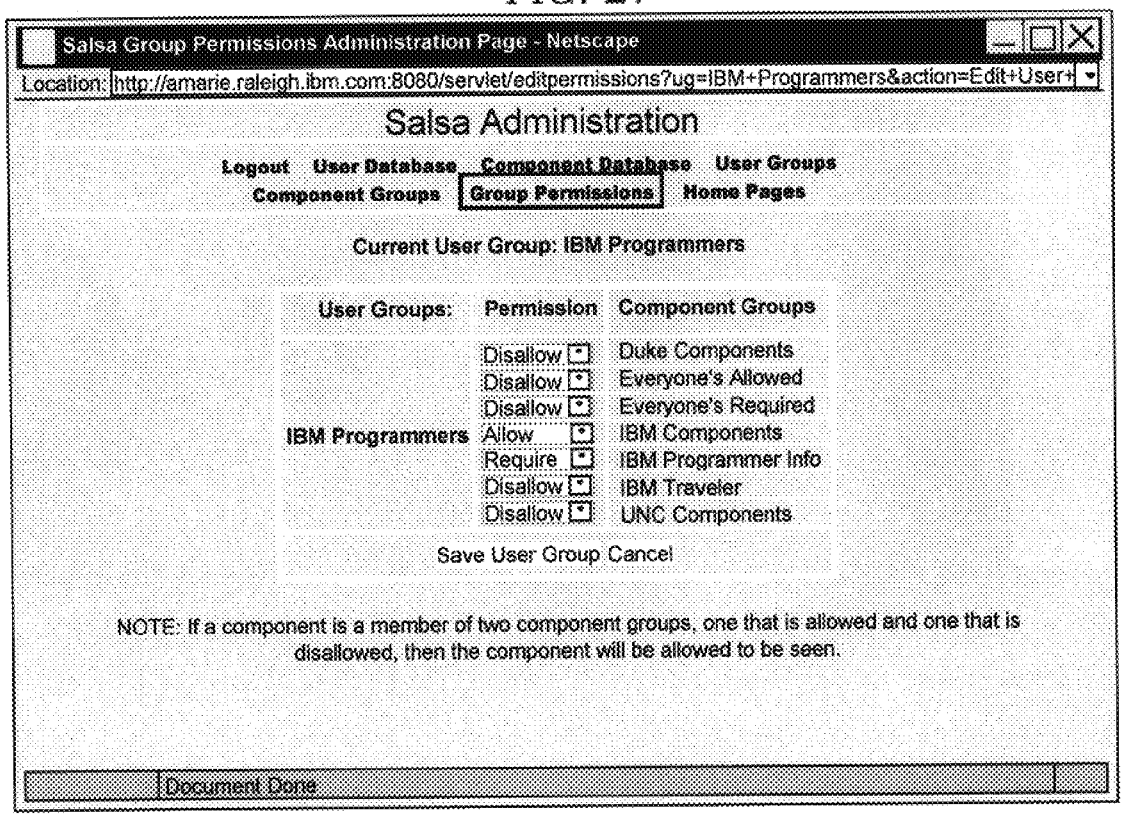

FIG. 27 illustrates what an administrator would see after selecting "IBM Programmers" and "Edit User Group" via FIG. 26. There are four permission types (i.e., disallow, allow, require, forbid) that an administrator can assign to user groups. The final permissions a user has to a component (i.e., unit of content) are determined by combining all of the permissions assigned to the component from all of its user group-component group associations, and using the highest-priority permission type.

The rules for combining the permissions are as follows: 4) Disallow: This is the default permission type. It has the lowest priority. If the final component permission is "Disallow," the user will not be allowed to display the component (unit of content) on their content page. 3) Allow:

This is the next higher-priority permission type. If the final component permission is "Allow," the user will be allowed to display the component (unit of content) on their content page, or they can choose not to display it. 2) Require: This is the next higher-priority permission type. If the final component permission is "Require," the user must display the component (unit of content) on their content page. 1) Forbid: This is the highest priority permission type. If the final component permission is "Forbid," the user will not be allowed to display the component (unit of content) on their content page.

For example, if the component (unit of content) "Duke CS Home Page" is in the "Duke" component group, which is Required by the "Duke Students" user group but Forbidden by the "UNC Students" user group, and a user is a member of both user groups, Required+Forbidden=Forbidden. If the "Duke CS Home Page" is also in the "Computer Science" component group, which is Disallowed by the "IBM Traveller" user group, and a user is a member of "Duke Students" and "IBM Traveller" but not "UNC Students", then Required+Disallowed=Required.

Figure 28:
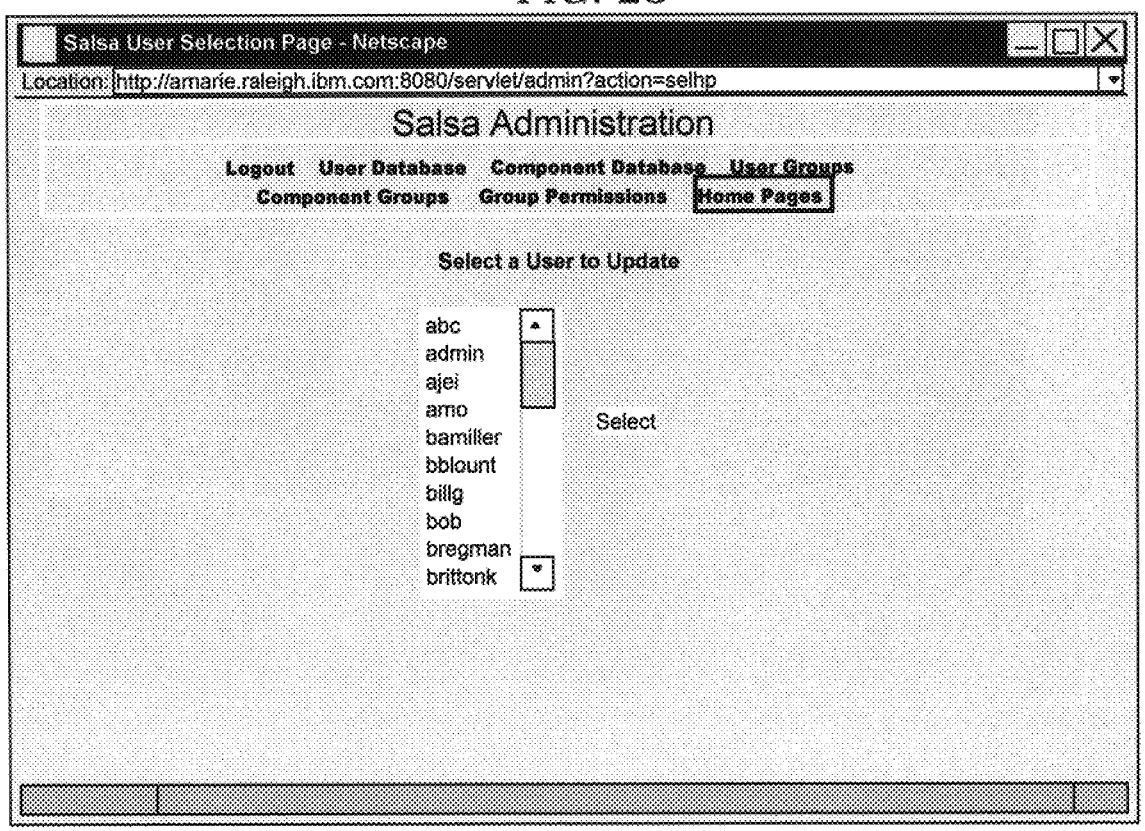

FIG. 28 illustrates a user interface from which an administrator can edit the content pages and profiles of other users.

Figure 29:
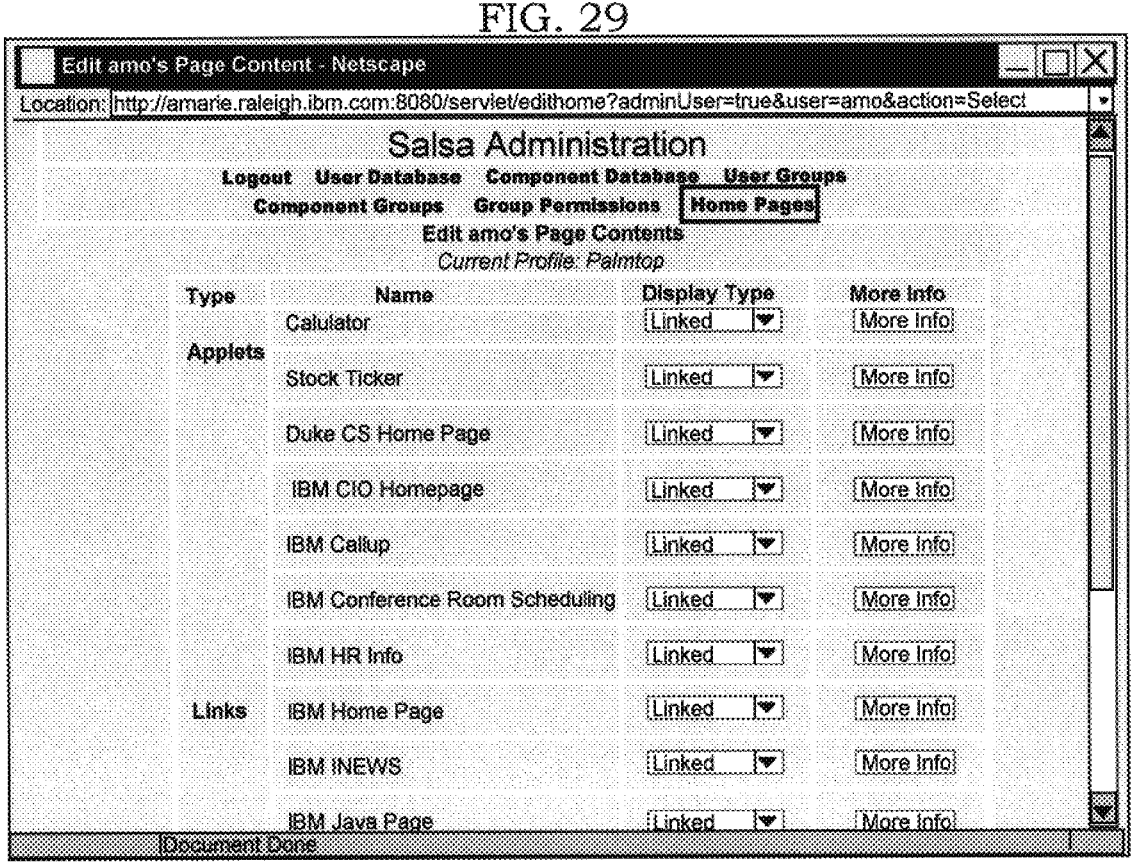

FIG. 29 illustrates a user interface for an administrator for editing the content page and profile of the user "amo." The displayed user interface is essentially the same as what "amo" would see. A different image map is displayed because the system has detected that the user is an administrator, and the screen colors may be different because "admin" is a different user than "amo" with his/her own profiles.

FIG. 30 illustrates how the "Edit Home Page" page is created. The present invention uses servlets and a template parser to combine data from the LDAP directory (such as the Required applets) and the HTML request (i.e., the user being edited and the user doing the editing) with a file like this to create the HTML a user sees in his/her browser.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of generating a content page to be displayed to a user of a computer network, the method comprising the steps of:

identifying the user;

identifying user groups to which the user is assigned;

identifying content groups associated with the identified user groups;

determining units of content assigned to the user based on the identified content groups associated with the identified user groups;

identifying a user device, wherein the user device is in communication with the computer network via a browser;

identifying a content page creation profile associated with the identified user device and assigned to the identified user, wherein the identified content page creation profile is configured to control how units of content are displayed to the identified user;

creating a content page to be displayed to the user using the identified content page creation profile, wherein the content page contains the identified units of content assigned to the user; and delivering the created content page to the identified user for display via the identified user device, comprising:
prefetching units of content assigned to one or more identified content groups including content accessible from hypertext links embedded within units of content;
exporting the prefetched units of content into a content package; and
transmitting the content package to the identified user device.

2. A method according to claim 1 wherein the content page creation profile contains an area wherein the identified user can modify what units of content are displayed.

3. A method according to claim 1 wherein the step of delivering the created content page to the identified user comprises delivering the created content page to the identified user prior to receiving a request from the identified user for a content page.

4. A method according to claim 1 further comprising:

determining whether units of content assigned to the identified user have changed;

prefetching the changed units of content if one or more units of content assigned to the identified user have changed;

exporting the prefetched changed units of content into a content package; and transmitting the content package to the identified user.

5. A method according to claim 1 further comprising the step of transforming prefetched units of content from a first format to a second format prior to exporting the prefetched units of content into a content package.

6. A method according to claim 1 wherein the step of exporting the prefetched units of content into a content package comprises exporting the prefetched units of content into a compressed content package.

7. A system of generating a content page to be displayed to a user of a computer network, comprising:

means for identifying the user;

means for identifying user groups to which the user is assigned;

means for identifying content groups associated with the identified user groups;

means for determining units of content assigned to the user based on the identified content groups associated with the identified user groups;

means for identifying a user device, wherein the user device is in communication with the computer network via a browser;

means for identifying a content page creation profile associated with the identified user device and assigned to the identified user, wherein the identified content page creation profile is configured to control how units of content are displayed to the identified user;

means for creating a content page to be displayed to the user using the identified content page creation profile, wherein the content page contains the identified units of content assigned to the user; and means for delivering the created content page to the identified user for display via the identified user device, comprising:
  means for are prefetching units of content assigned to one or more identified content groups including content accessible from hypertext links embedded within units of content;
  means for exporting the prefetched units of content into a content package; and
  mean for transmitting the content package to the identified user device.

8. A system according to claim 7 wherein the content page creation profile contains an area wherein the identified user can modify what units of content are displayed.

9. A system according to claim 7 wherein the means for delivering the created content page to the identified user comprises means for delivering the created content page to the identified user prior to receiving a request from the identified user for a content page.

10. A system according to claim 7 further comprising:
  means for determining whether units of content assigned to the identified user have changed;
  means for prefetching the changed units of content if one or more units of content assigned to the identified user have changed;
  means for exporting the prefetched changed units of content into a content package; and
  means for transmitting the content package to the identified user.

11. A system according to claim 7 further comprising means for transforming prefetched units of content from a first format to a second format prior to exporting the prefetched units of content into a content package.

12. A system according to claim 7 wherein the means for exporting the prefetched units of content into a content package comprises means for exporting the prefetched units of content into a compressed content package.

13. A computer program product for generating a content page to be displayed to a user of a computer network, the computer program product comprising a computer usable storage medium having computer readable program code means embodied in the medium, the computer readable program code means comprising:
  computer readable program code means for identify the user;
  computer readable program code means for identifying user groups to which the user is assigned;
  computer readable program code means for identifying content groups associated with the identified user groups;
  computer readable program code means for determining units of content assigned to the user based on the identified content groups associated with the identified user groups;
  computer readable program code means for identifying a user device, wherein the user device is in communication with the computer network via a browser;
  computer readable program code means for identifying a content page creation profile associated with the identified user device and assigned to the identified user, wherein the identified content page creation profile is configured to control how units of content are displayed to the identified user;
  computer readable program code means for creating a content page to be displayed to the user using the identified content page creation profile, wherein the content page contains the identified units of content assigned to the user; and
  computer readable program code means for delivering the created content page to the identified user for display via the identified user device, comprising:
    computer readable program code means for prefetching units of content assigned to one or more identified content groups including content accessible from hypertext links embedded within units of content;
    computer readable program code means for exporting the prefetched units of content into a content package; and
    computer readable program code means for transmitting the content package to the identified user device.

14. A computer program product according to claim 13 wherein the content page creation profile contains an area wherein the identified user can modify what units of content are displayed.

15. A computer program product according to claim 13 wherein the computer readable program code means for delivering the created content page to the identified user comprises computer readable program code means for delivering the created content page to the identified user prior to receiving a request from the identified user for a content page.

16. A computer program product according to claim 13 further comprising:
  computer readable program code means for determining whether units of content assigned to the identified user have changed;
  computer readable program code means for prefetching the changed units of content if one or more units of content assigned to the identified user have changed;
  computer readable program code means for exporting the prefetched changed units of content into a content package; and
  computer readable program code means for transmitting the content package to the identified user.

17. A computer program product according to claim 13 further comprising computer readable program code means for transforming prefetched units of content from a first format to a second format prior to exporting the prefetched units of content into a content package.

18. A computer program product according to claim 13 wherein the computer readable program code means for exporting the prefetched units of content into a content package comprises computer readable program code means for exporting the prefetched units of content into a compressed content package.

* * * * *

UNITED STATES PATENT AND TRADEMARK OFFICE
CERTIFICATE OF CORRECTION

PATENT NO.   : 6,195,696 B1
DATED        : February 27, 2001
INVENTOR(S)  : Baber et al.

It is certified that error appears in the above-identified patent and that said Letters Patent is hereby corrected as shown below:

Column 17,
Line 10, please delete "mean" and substitute -- means -- therefor.

Signed and Sealed this

Twenty-ninth Day of July, 2003

JAMES E. ROGAN
*Director of the United States Patent and Trademark Office*